（12） United States Patent
Chu et al.

(10) Patent No.: US 11,503,499 B2
(45) Date of Patent: *Nov. 15, 2022

(54) ACKNOWLEDGEMENT OF TRANSMISSIONS IN A WIRELESS LOCAL AREA NETWORK

(71) Applicant: NXP USA, INC., Austin, TX (US)

(72) Inventors: Liwen Chu, San Ramon, CA (US); Hongyuan Zhang, Fremont, CA (US); Hui-Ling Lou, Sunnyvale, CA (US)

(73) Assignee: NXP USA, INC., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/119,729

(22) Filed: Dec. 11, 2020

(65) Prior Publication Data

US 2021/0099908 A1    Apr. 1, 2021

Related U.S. Application Data

(63) Continuation of application No. 16/430,034, filed on Jun. 3, 2019, now Pat. No. 10,873,878, which is a (Continued)

(51) Int. Cl.
*H04W 28/04* (2009.01)
*H04L 1/16* (2006.01)
(Continued)

(52) U.S. Cl.
CPC .......... *H04W 28/04* (2013.01); *H04B 7/0452* (2013.01); *H04L 1/1614* (2013.01);
(Continued)

(58) Field of Classification Search
CPC ..... H04W 28/04; H04W 28/18; H04W 28/20; H04W 28/22; H04W 84/12; H04B 7/0452;
(Continued)

(56) References Cited

U.S. PATENT DOCUMENTS 7,489,688 B2    2/2009 Giesberts et al.
9,900,871 B1    2/2018 Ryu et al.
(Continued)

FOREIGN PATENT DOCUMENTS

WO    2006091809 A2    8/2006

OTHER PUBLICATIONS

Non-final office action dated Oct. 25, 2021 in U.S. Appl. No. 17/099,039.
(Continued)

*Primary Examiner* — Candal Elpenord

(57) ABSTRACT

A first communication device receives one or more aggregate medium access control (MAC) data units from respective one or more second communication devices. Respective aggregate MAC data units include multiple MAC data units from respective ones of the one or more second communication devices. The first communication device generates one or more acknowledgement information fields, including a first acknowledgement information field corresponding to a particular second communication device includes i) a length indication that indicates a length of an acknowledgement field, and ii) the acknowledgment field of the indicated length. The acknowledgement field includes respective acknowledgement information for at least some of the multiple MAC data units received from the particular second communication device. The first communication device generates an acknowledgement data unit to include the one or more one or more acknowledgement information fields, and transmits the acknowledgment data unit to the one or more second communication devices.

18 Claims, 17 Drawing Sheets

Related U.S. Application Data continuation of application No. 16/039,248, filed on Jul. 18, 2018, now Pat. No. 10,313,923, which is a continuation-in-part of application No. 15/438,578, filed on Feb. 21, 2017, now Pat. No. 10,277,376.

(60) Provisional application No. 62/534,106, filed on Jul. 18, 2017, provisional application No. 62/323,400, filed on Apr. 15, 2016, provisional application No. 62/304,570, filed on Mar. 7, 2016, provisional application No. 62/298,057, filed on Feb. 22, 2016, provisional application No. 62/297,236, filed on Feb. 19, 2016.

(51) Int. Cl.

| | |
|---|---|
| *H04L 12/851* | (2013.01) |
| *H04L 1/18* | (2006.01) |
| *H04L 27/26* | (2006.01) |
| *H04W 28/18* | (2009.01) |
| *H04B 7/0452* | (2017.01) |
| *H04L 47/2441* | (2022.01) |
| *H04W 84/12* | (2009.01) |
| *H04L 5/00* | (2006.01) |

(52) U.S. Cl.
CPC .......... *H04L 1/1671* (2013.01); *H04L 1/1835* (2013.01); *H04L 27/2601* (2013.01); *H04L 27/2602* (2013.01); *H04L 47/2441* (2013.01); *H04W 28/18* (2013.01); *H04L 5/0055* (2013.01); *H04W 84/12* (2013.01)

(58) Field of Classification Search
CPC ... H04L 1/1614; H04L 1/1617; H04L 1/1835; H04L 1/1854; H04L 1/1861; H04L 1/1864; H04L 27/2601; H04L 27/2602; H04L 47/2441; H04L 5/0055; H04L 5/0057
USPC ......................................................... 370/245
See application file for complete search history.

(56) References Cited

U.S. PATENT DOCUMENTS

| | | | |
|---|---|---|---|
| 10,129,001 | B2 | 11/2018 | Seok |
| 10,334,475 | B2 | 6/2019 | Xi et al. |
| 10,856,349 | B2 | 12/2020 | Chu et al. |
| 2003/0135640 | A1 | 7/2003 | Ho et al. |
| 2008/0130538 | A1 | 6/2008 | Raissinia et al. |
| 2009/0067396 | A1* | 3/2009 | Fischer ............... H04L 1/1854 455/41.2 |
| 2013/0086222 | A1 | 4/2013 | Kazawa et al. |
| 2013/0121286 | A1* | 5/2013 | Trainin ................ H04L 49/90 370/329 |
| 2015/0146699 | A1* | 5/2015 | Wentink ........... H04W 72/0446 370/336 |
| 2015/0288501 | A1* | 10/2015 | Kwon ................ H04L 1/1614 370/329 |
| 2016/0029373 | A1 | 1/2016 | Song |
| 2016/0066318 | A1 | 3/2016 | Pereira et al. |
| 2016/0088602 | A1 | 3/2016 | Seok |
| 2016/0374093 | A1* | 12/2016 | Asterjadhi ........ H04W 72/0486 |
| 2017/0055300 | A1* | 2/2017 | Pitchaiah ............. H04W 76/11 |
| 2017/0064583 | A1 | 3/2017 | Roy et al. |
| 2017/0078003 | A1* | 3/2017 | Ghosh .................. H04W 74/04 |
| 2018/0338325 | A1 | 11/2018 | Ryu et al. |

OTHER PUBLICATIONS

Notice of Allowance dated Mar. 30, 2021 in U.S. Appl. No. 16/044,234.

Mediatek, Inc., et al. vs. NXP Semiconductors N.V., et al., "Mediatek's Preliminary Invalidity Contentions", in the United States District Court, Central District of California, Case No. 2:21-cv-4969-GW-AFM, Feb. 17, 2022.

Mediatek, Inc., et al. vs. NXP Semiconductors N.V., et al., Exhibit 224-A, "Invalidity of U.S. Pat. No. 10,278,224 ("the '224 patent") in View of US Patent App. Pub. No. 2016/0029373 ("Seok-373")", United States District Court, Central District of California, Case No. 2:21-cv-4969-GW-AFM.

Mediatek, Inc., et al. vs. NXP Semiconductors N.V., et al., Exhibit 224-B, "Invalidity of U.S. Pat. No. 10,278,224 ("the '224 patent") in View of US Patent App. Pub. No. 10,334,475 ("Xi")", United States District Court, Central District of California, Case No. 2:21-cv-4969-GW-AFM.

Mediatek, Inc., et al. vs. NXP Semiconductors N.V., et al., Exhibit 224-C, "Table of Contents", United States District Court, Central District of California, Case No. 2:21-cv-4969-GW-AFM.

IEEE Std 802.11-2012, "IEEE Standard for Information technology—Telecommunications and information exchange between systems Local and metropolitan area networks—Specific requirements Part 11: Wireless LAN Medium Access Control (MAC) and Physical Layer (PHY) Specifications", Mar. 29, 2012.

Notice of Allowance dated Jun. 9, 2022 in U.S. Appl. No. 17/099,039.

Notice of Allowance dated Feb. 25, 2022 in U.S. Appl. No. 17/099,039.

\* cited by examiner

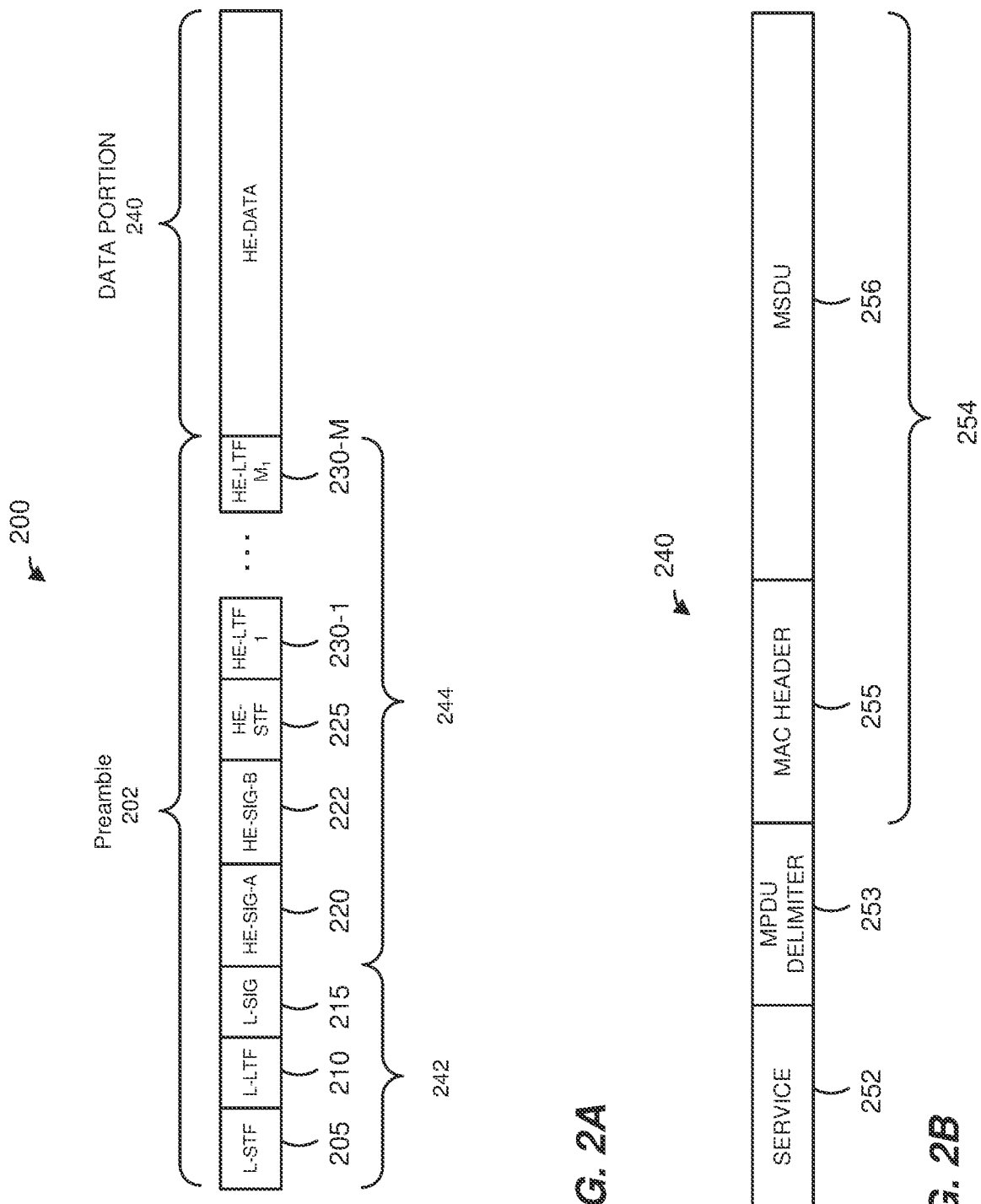

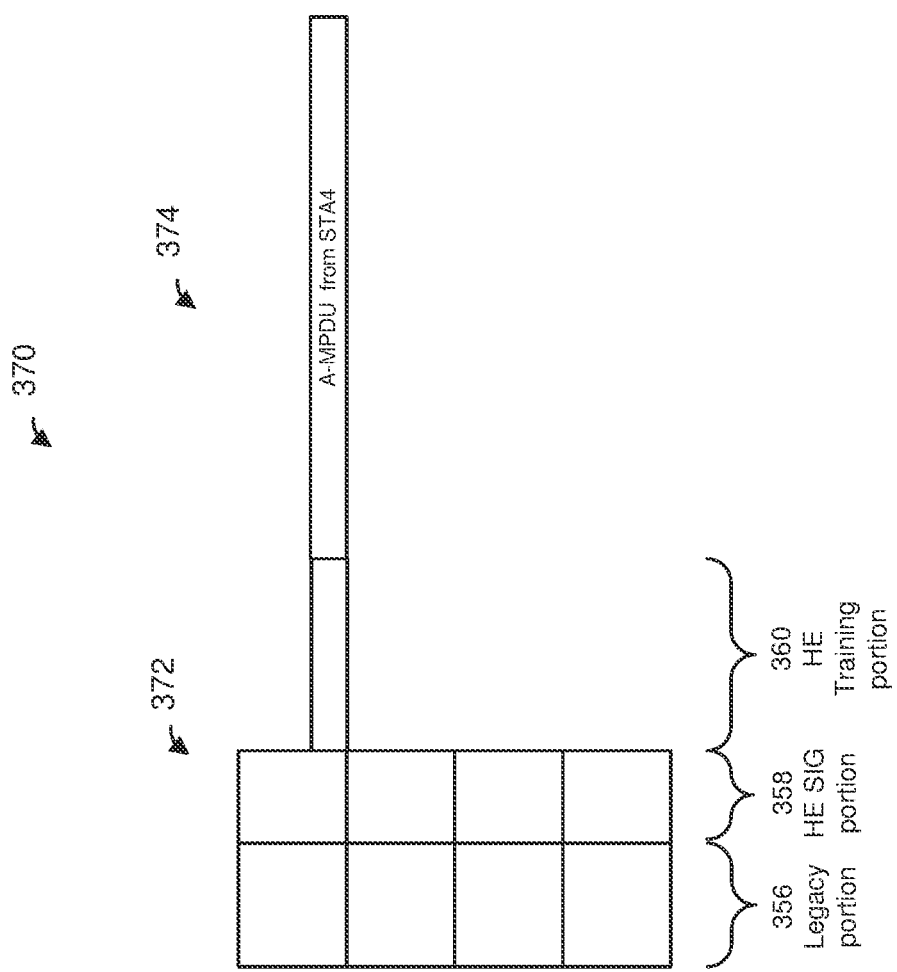

| Additional Length | Block Ack bitmap length | Length of Block Ack bitmap field (bytes) | Maximum number of MPDUs (MSDUs/A-MSDUs) that can be acknowledged |
|---|---|---|---|
| 0 | 00 | 8 | 64 |
| 0 | 01 | 16 | 128 |
| 0 | 10 | 32 | 256 |
| 0 | 11 | 4 | 32 |
| 1 | 00 | 48 | 384 |
| 1 | 01 | 64 | 512 |
| 1 | 10 | 80 | 640 |
| 1 | 11 | 96 | 768 |

ACKNOWLEDGEMENT OF TRANSMISSIONS IN A WIRELESS LOCAL AREA NETWORK

CROSS-REFERENCE TO RELATED APPLICATION

This application is a continuation application of U.S. patent application entitled "ACKNOWLEDGEMENT OF TRANSMISSIONS IN A WIRELESS LOCAL AREA NETWORK", having a serial number of Ser. No. 16/430,034, having a filing date of Jun. 3, 2019; which is a continuation application of U.S. patent application entitled "ACKNOWLEDGEMENT OF TRANSMISSIONS IN A WIRELESS LOCAL AREA NETWORK", having a serial number of Ser. No. 16/039,248, having a filing date of Jul. 18, 2018; which claims the benefit of U.S. provisional application entitled "BLOCK ACKNOWLEDGEMENT (BA) OF TRANSMISSIONS IN A WIRELESS LOCAL AREA NETWORK", having a serial number of Ser. No. 62/534,106, and having a filling date of Jul. 18, 2017; and which is a Continuation-in-Part of U.S. patent application entitled "ACKNOWLEDGEMENT OF TRANSMISSIONS IN A WIRELESS LOCAL AREA NETWORK", having a serial number of Ser. No. 15/438,578, having a filing date of Feb. 21, 2017; which claims the benefit of U.S. provisional application entitled "SUPER BA DESIGN", having a serial number of Ser. No. 62/323,400, and having a filling date of Apr. 15, 2016, and which claims the benefit of U.S. provisional application entitled "ACKNOWLEDGEMENT OF OFDMA A-MPDU WITH MULTIPLE TCs", having a serial number of Ser. No. 62/304,570, and having a filling date of Mar. 7, 2016; and which claims the benefit of U.S. provisional application entitled "SUPER BA DESIGN", having a serial number of Ser. No. 62/298,057, and having a filling date of Feb. 22, 2016; and which claims the benefit of U.S. provisional application entitled "ACKNOWLEDGEMENT OF OFDMA A-MPDU WITH MULTIPLE TCs", having a serial number of Ser. No. 62/297,236, and having a filling date of Feb. 19, 2016, having common inventors, and having a common assignee, all of which is incorporated by reference in its entirety.

FIELD OF THE DISCLOSURE

The present disclosure relates generally to communication networks and, more particularly, to wireless local area networks that utilize orthogonal frequency division multiplexing (OFDM).

BACKGROUND

Wireless local area networks (WLANs) have evolved rapidly over the past decade. Development of WLAN standards such as the Institute for Electrical and Electronics Engineers (IEEE) 802.11a, 802.11b, 802.11g, 802.11n, and 802.11ac Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput of over a gigabyte per second (Gbps) range. The IEEE 802.11ax Standard supports both downlink (DL) and uplink (UL) multi-user (MU) transmissions, such as orthogonal frequency division multiple access (OFDMA) transmissions and multi-user multiple input multiple output (MU-MIMO) transmissions, and provides throughput of over four Gbps. Future standards promise to provide even greater throughputs, such as throughputs in the tens of Gbps range.

SUMMARY

In an embodiment, a method for acknowledging a data unit includes: receiving, at a first communication device, one or more aggregate medium access control (MAC) data units from respective one or more second communication devices, respective ones of the one or more aggregate MAC data units including respective sets of multiple MAC data units from respective ones of the one or more second communication devices; generating, at the first communication device, one or more acknowledgement information fields corresponding to the one or more second communication devices, including generating a first acknowledgement information field corresponding to a particular second communication device of the one or more second communication devices, wherein the first acknowledgement field includes i) a length indication that indicates a length of an acknowledgement field, and ii) the acknowledgment field of the indicated length, wherein the acknowledgement field includes respective acknowledgement information for at least some of the multiple MAC data units received from the particular second communication device, and wherein the length of the acknowledgement field is determined based at least in part on a buffer size negotiated in an acknowledgement setup procedure previously conducted between the first communication device and the particular second communication device; generating, at the first communication device, an acknowledgement data unit to include the one or more one or more acknowledgement information fields; and transmitting the acknowledgment data unit from the first communication device to the one or more second communication devices.

In another embodiment, a first communication device comprises a network interface having one or more integrated circuits configured to: receive one or more aggregate medium access control (MAC) data units from respective one or more second communication devices, respective ones of the one or more aggregate MAC data units including respective sets of multiple MAC data units from respective ones of the one or more second communication devices; generate one or more acknowledgement information fields corresponding to the one or more second communication devices, including generating a first acknowledgement information fields corresponding to a particular second communication device of the one or more second communication devices, wherein the first acknowledgement field includes i) a length indication that indicates a length of an acknowledgement field, and ii) the acknowledgment field of the indicated length, wherein the acknowledgement field includes respective acknowledgement information for at least some of the multiple MAC data units received from the particular second communication device, and wherein the length of the acknowledgement field is determined based at least in part on a buffer size negotiated in an acknowledgement setup procedure previously conducted between the first communication device and the particular second communication device; generate an acknowledgement data unit to include at least the first acknowledgement information field;

and cause the acknowledgment data unit to be transmitted to the one or more second communication devices.

BRIEF DESCRIPTION OF THE DRAWINGS

FIG. 2A is a block diagram of an example data unit, according to an embodiment;

FIG. 2B is a diagram of an example data portion of the data unit data unit of FIG. 2A, according to an embodiment;

FIGS. 3A-3C are block diagrams of example data units, according to embodiments;

FIG. 15 is a table illustrating an example interpretations of values of subfields of a an acknowledgement information field, according to an embodiment.

DETAILED DESCRIPTION

Figure 1:
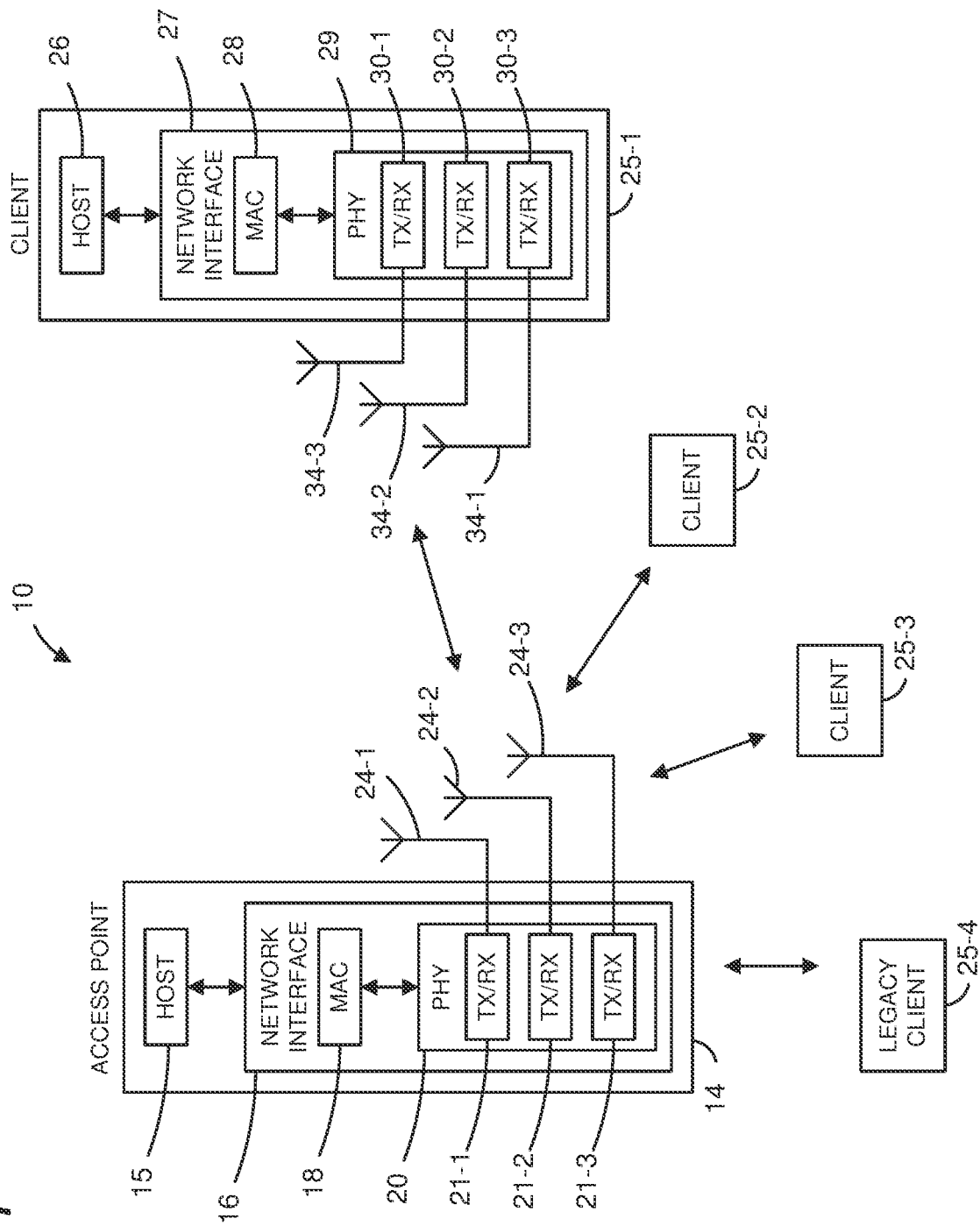
FIG. 1 is a block diagram of an example wireless local area network (WLAN), according to an embodiment.

In embodiments described below, a wireless network device such as an access point (AP) of a wireless local area network (WLAN) communicates with one or more client stations. The AP is configured to communicate with client stations according to at least a first communication protocol. The first communication protocol is sometimes referred to herein as "a next generation (NG) WLAN." In some embodiments, different client stations in the vicinity of the AP are configured to operate according to one or more other communication protocols that define operation in the same frequency band as the NG WLAN communication protocol but with generally lower data throughputs. The lower data throughput communication protocols (e.g. IEEE 802.11a, IEEE 802.11g, IEEE 802.11n, IEEE 802.11ac and/or IEEE 802.11ax) are collectively referred herein as "legacy" communication protocols.

The AP transmits data streams to respective client stations, in an embodiment. For example, the AP transmits a data unit, including, for example, an aggregate data unit that aggregates multiple higher layer data units (e.g., multiple media access control (MAC) layer data units) to a client station. Similarly, the respective client stations transmit data streams to the AP. For example, a client station transmits a data unit, including, for example, an aggregate data unit that aggregates multiple higher layer data units (e.g., multiple media access control (MAC) layer data units) to the AP. In some embodiments, the AP concurrently (e.g., simultaneously) transmits independent data streams to multiple client stations and/or receives independent data streams concurrently (e.g., simultaneously) transmitted by multiple client stations. For example, the AP transmits respective aggregate data units, that aggregate higher layer (e.g., MAC) data units, to respective client stations in different orthogonal frequency division multiplexing (OFDM) sub-channels of a downlink orthogonal frequency division multiple access (OFDMA) transmission, in an embodiment. Similarly, multiple client stations transmit respective aggregate data units, that aggregate higher layer (e.g., MAC) data units, to the AP concurrently (e.g., simultaneously), in particular, each client station transmits its aggregate data unit in a different OFDM sub-channel of an uplink OFDMA transmission, in an embodiment. Additionally or alternatively, the AP transmits aggregate data units for respective client stations using different spatial streams of a downlink multi-user multiple input multiple output (MU-MIMO) transmission. Similarly, respective client stations transmit aggregate data units to the AP concurrently (e.g., simultaneously) using different spatial streams within an uplink MU-MIMO transmission to the AP, in an embodiment.

In an embodiment, upon receiving transmissions from one or more client stations, the AP acknowledges receipt of the one or more transmissions by transmitting one or more acknowledgement data units to the client stations. For example, in an embodiment, the AP transmits an OFDMA acknowledgement data unit that includes respective acknowledgements intended for different client stations in different OFDM sub-channels. In another embodiment, the AP transmits an MU-MIMO acknowledgment data unit that includes respective acknowledgements intended for different client stations transmitted in different spatial streams. In yet another embodiment, the AP transmits a broadcast acknowledgement data unit that is broadcast to the multiple client stations and includes the respective acknowledgements intended for the multiple client stations, or a multicast acknowledgement data unit that is multicast to the multiple client stations and includes the respective acknowledgements intended for the multiple client stations. In an embodiment, an acknowledgment data unit to one or more client stations includes respective variable length acknowledgement fields corresponding to respective ones of the one or more client stations, and respective indications that indicate the respective acknowledgement field lengths. In this embodiment, respective lengths of the acknowledgment fields can be selected based on respective maximum numbers of higher layer data units that can be aggregated in a single aggregate data unit from the corresponding one or more client stations. The AP acknowledges receipt of simultaneous transmissions from one or more client stations in other suitable manners, in other embodiments.

In some embodiments, the first communication protocol supports aggregation of a greater maximum number of higher layer data unit in a single transmission as compared to the maximum number of higher layer data unit that can be aggregated in a single transmission according to a legacy communication protocol. Accordingly, an acknowledgement unit that acknowledges a transmission from a communication device (e.g., the AP of a client station) that aggregates a number of higher layer data units that exceeds the maximum number supported by the legacy communication protocol would require a length of an acknowledgement field to exceed a maximum acknowledgement field length defined in the legacy communication protocol. In some embodiments, an acknowledgement unit that acknowledges a transmission from a communication device (e.g., the AP or a client station) that aggregates a number of higher layer data units that exceeds the maximum number supported by the legacy communication protocol includes multiple acknowledgement fields, with respective ones of the multiple acknowledgement fields acknowledging respective subsets of the higher layer data units. In such embodiments, the greater number of higher layer data units is acknowledged without exceeding the maximum acknowledgement field length defined in the legacy communication protocol. These and other techniques described herein enhance operation of the WLAN in scenarios in which the WLAN includes communication devices that conform to the first communication protocol and communication devices that do not conform to the first communication protocol but conform to the legacy communication protocol. For example, such techniques allow the AP to transmit a single acknowledgement data unit that includes one or more acknowledgement fields for a client station that conforms to the first communication protocol and one or more acknowledgement fields for a client station that does not conform to the first communication protocol but conforms to the legacy communication protocol, where the maximum lengths of the respective acknowledgement fields do not exceed the maximum acknowledgement field length supported by the legacy communication protocol, in an embodiment.

FIG. 1 is a block diagram of an example wireless local area network (WLAN) 10, according to an embodiment. An AP 14 includes a host processor 15 coupled to a network interface 16. In an embodiment, the network interface 16 includes one or more integrate circuits (iCs) configured to operate as discussed below. The network interface 16 includes a MAC processor 18 and a PHY processor 20. The PHY processor 20 includes a plurality of transceivers 21, and the transceivers 21 are coupled to a plurality of antennas 24. Although three transceivers 21 and three antennas 24 are illustrated in FIG. 1, the AP 14 includes different numbers (e.g., 1, 2, 4, 5, etc.) of transceivers 21 and antennas 24 in other embodiments. In some embodiments, the AP 14 includes a higher number of antennas 24 than transceivers 21, and antenna switching techniques are utilized. In an embodiment, the MAC processor 18 is implemented on at least a first IC, and the PHY processor 20 is implemented on at least a second IC. In an embodiment, at least a portion of the MAC processor 18 and at least a portion of the PHY processor 20 are implemented on a single IC.

In various embodiments, the MAC processor 18 and the PHY processor 20 are configured to operate according to a first communication protocol (e.g., a High Efficiency, HE, or 802.11ax communication protocol). In some embodiments, the MAC processor 18 and the PHY processor 20 are also configured to operate according to a second communication protocol (e.g., according to the IEEE 802.11ac Standard). In yet another embodiment, the MAC processor 18 and the PHY processor 20 are additionally configured to operate according to the second communication protocol, a third communication protocol, and/or a fourth communication protocol (e.g., according to the IEEE 802.11a Standard and/or the IEEE 802.11n Standard).

The WLAN 10 includes a plurality of client stations 25. Although four client stations 25 are illustrated in FIG. 1, the WLAN 10 includes different numbers (e.g., 1, 2, 3, 5, 6, etc.) of client stations 25 in various scenarios and embodiments. At least one of the client stations 25 (e.g., client station 25-1) is configured to operate at least according to the first communication protocol. In some embodiments, at least one of the client stations 25 is not configured to operate according to the first communication protocol but is configured to operate according to at least one of the second communication protocol, the third communication protocol, and/or the fourth communication protocol (referred to herein as a "legacy client station").

The client station 25-1 includes a host processor 26 coupled to a network interface 27. In an embodiment, the network interface 27 includes one or more ICs configured to operate as discussed below. The network interface 27 includes a MAC processor 28 and a PHY processor 29. The PHY processor 29 includes a plurality of transceivers 30, and the transceivers 30 are coupled to a plurality of antennas 34. Although three transceivers 30 and three antennas 34 are illustrated in FIG. 1, the client station 25-1 includes different numbers (e.g., 1, 24, 5, etc.) of transceivers 30 and antennas 34 in other embodiments. In some embodiments, the client station 25-1 includes a higher number of antennas 34 than transceivers 30, and antenna switching techniques are utilized. In an embodiment, the MAC processor 28 is implemented on at least a first IC, and the PHY processor 29 is implemented on at least a second IC. In an embodiment, at least a portion of the MAC processor 28 and at least a portion of the PHY processor 29 are implemented on a single KC.

According to an embodiment, the client station 25-4 is a legacy client station, i.e., the client station 25-4 is not enabled to receive and fully decode a data unit that is transmitted by the AP 14 or another client station 25 according to the first communication protocol. Similarly, according to an embodiment, the legacy client station 25-4 is not enabled to transmit data units according to the first communication protocol. On the other hand, the legacy client station 25-4 is enabled to receive and fully decode and transmit data units according to the second communication protocol, the third communication protocol, and/or the fourth communication protocol.

In an embodiment, one or both of the client stations 25-2 and 25-3, has a structure that is the same as or similar to the client station 25-1. In an embodiment, the client station 25-4 has a structure similar to the client station 25-1. In these embodiments, the client stations 25 structured the same as or similar to the client station 25-1 have the same or a different number of transceivers and antennas. For example, the client station 25-2 has only two transceivers and two antennas (not shown), according to an embodiment.

In various embodiments, the MAC processor 18 and the PHY processor 20 of the AP 14 are configured to generate data units conforming to the first communication protocol and having formats described herein. In some embodiments, the MAC processor 18 and the PHY processor 20 are additionally configured to generate data units conforming to the second communication protocol, the third communication protocol, and/or the fourth communication protocol. In an embodiment, the MAC processor 18 is configured to implement MAC layer functions, including MAC layer functions of the first communication protocol. In an embodiment, the PHY processor 20 is configured to implement PHY functions, including PHY functions of the first communication protocol. For example, in an embodiment, the MAC processor 18 is configured to generate MAC layer data units such as MPDUs, MAC control frames, etc., and provide the MAC layer data units to the PHY processor 20. In an embodiment, the PHY processor 20 is configured to receive MAC layer data units from the MAC processor 18 and encapsulate the MAC layer data units to generate PHY data units such as PHY protocol data units (PPDUs) for transmission via the antennas 24. Similarly, in an embodiment, the PHY processor 20 is configured to receive PHY data units that were received via the antennas 24, and extract MAC layer data units encapsulated within the PHY data units. In an embodiment, the PHY processor 20 provides the extracted MAC layer data units to the MAC processor 18, which processes the MAC layer data units.

The transceiver(s) 21 is/are configured to transmit the generated data units via the antenna(s) 24. Similarly, the transceiver(s) 21 is/are configured to receive data units via the antenna(s) 24. The MAC processor 18 and the PHY processor 20 of the AP 14 are configured to process received data units conforming to the first communication protocol and having formats described hereinafter and to determine that such data units conform to the first communication protocol, according to various embodiments.

In various embodiments, the MAC processor 28 and the PHY processor 29 of the client device 25-1 are configured to generate data units conforming to the first communication protocol and having formats described herein. In some embodiments, the MAC processor 28 and the PHY processor 29 are additionally configured to generate data units conforming to the second communication protocol, the third communication protocol, and/or the fourth communication protocol. In an embodiment, the MAC processor 28 is configured to implement MAC layer functions, including MAC layer functions of the first communication protocol. In an embodiment, the PHY processor 29 is configured to implement PHY functions, including PHY functions of the first communication protocol. For example, in an embodiment, the MAC processor 28 is configured to generate MAC layer data units such as MPDUs, MAC control frames, etc., and provide the MAC layer data units to the PHY processor 29. In an embodiment, the PHY processor 29 is configured to receive MAC layer data units from the MAC processor 28 and encapsulate the MAC layer data units to generate PHY data units such as PPDUs for transmission via the antennas 34. Similarly, in an embodiment, the PHY processor 29 is configured to receive PHY data units that were received via the antennas 34, and extract MAC layer data units encapsulated within the PHY data units. In an embodiment, the PHY processor 29 provides the extracted MAC layer data units to the MAC processor 28, which processes the MAC layer data units.

The transceiver(s) 30 is/are configured to transmit the generated data units via the antenna(s) 34. Similarly, the transceiver(s) 30 is/are configured to receive data units via the antenna(s) 34. The MAC processor 28 and the PHY processor 29 of the client device 25-1 are configured to process received data units conforming to the first communication protocol and having formats described hereinafter and to determine that such data units conform to the first communication protocol, according to various embodiments.

FIG. 2A is a block diagram of a physical layer (PHY) data unit 200 that the AP 14 is configured to transmit to one or more client stations 25 (e.g., the client stations 25-1), according to an embodiment. In an embodiment, one or more client stations 25 (e.g., the client stations 25-1) are also configured to transmit data units the same as or similar to the data unit 200 to the AP 14. The data unit 200 conforms to the HE communication protocol and occupies a 20 MHz bandwidth. Data units similar to the data unit 200 occupy other suitable bandwidth such as 40 MHz, 80 MHz, 160 MHz, 320 MHz, 640 MHz, for example, or other suitable bandwidths, in other embodiments. The data unit 200 is suitable for "mixed mode" situations, i.e. when the WLAN 10 includes a client station (e.g., the legacy client station 25-4) that conforms to a legacy communication protocol, but not the first communication protocol. The data unit 200 is utilized in other situations as well, in some embodiments.

In various embodiments and/or scenarios, the data unit 200 is a downlink (DL) orthogonal frequency division multiple access (OFDMA) unit in which independent data streams are transmitted to multiple client stations 25 using respective sets of OFDM tones and, in some cases respective spatial streams, allocated to the client stations 25. Similarly, in various embodiments and/or scenarios, the data unit 200 is an uplink (UL) OFDMA data unit transmitted by a particular client station 25 as part of an OFDMA uplink transmission by multiple client stations 25, wherein each of the multiple client stations 25 transmits data using a set of OFDM tones and, in some cases, respective one or more spatial streams, allocated to the client station 25. In an embodiment, available OFDM tones (e.g., OFDM tones that are not used as DC tone and/or guard tones) are partitioned into multiple resource units (RUs), and each of the multiple RUs is allocated to one or more client stations 25 for transmission of data to, or by, the one or more of the client stations 25. In an embodiment, allocation of OFDM tones is performed using basic resource unit blocks defined by the first communication protocol. A basic resource unit block is sometimes referred to herein as simply a "basic resource unit." In an embodiment, a basic resource unit includes K OFDM tones, wherein K is an integer greater than zero, and each allocated resource unit is comprised of one or more K-OFDM tone basic resource units. In an embodiment, K=26. Accordingly, a basic resource unit includes 26 OFDM tones, in this embodiment. A resource unit allocated to a client station 25, or allocated to a multi-user group of client stations 25, includes a number of OFDM tones that is an integer multiple of 26 OFDM tones, such as 26 OFDM tones, 52 OFDM tones, 106 OFDM tones, etc., in this embodiment. In another embodiment, K is any suitable integer other than 26, and a basic resource unit includes a corresponding number of OFDM tones other than 26.

The data unit 200 includes a preamble 202 including a legacy short training field (L-STF) 205, a legacy long training field (L-LTF) 210, a legacy signal field (L-SIG) 215, a first HE signal field (HE-SIG-A) 220, a second HE signal field (HE-SIG-B) 222, an HE short training field (HE-STF) 225, and M HE long training fields (HE-LTFs) 230. L-STF 205, L-LTF 210 and L-SIG 215 comprise a legacy preamble portion 242 of the preamble 202. The HE-SIG-A 220, the HE-SIG-B 222, the HE-STF 225 and the M HE-LTFs 230 comprise an HE preamble portion 244 of the preamble 202. In some embodiments and/or scenarios, the data unit 200 also includes a data portion 240. Referring briefly to FIG. 2B, in an embodiment, the data portion 240 includes a service field 252, and a MAC protocol data unit (MPDU) delimiter 253 followed by an MPDU 254. The MPDU 254 includes a MAC header 255 and a MAC service data unit (MSDU) 256. In some embodiments, the data portion 240 includes an aggregate MPDU (A-MPDU) which includes multiple MPDU delimiter fields 253, each MPDU delimiter field 253 optionally followed by a respective MPDU 254. In some embodiments, each of one or more of the MSDUs 256 included in the data portion 240 is an aggregate MSDU (A-MSDU) that aggregates multiple MSDUs. In an embodiment, the first communication protocol defines a maximum number of MPDUs and, accordingly, a maximum number of MSDUs/A-MSDUs, that can be aggregated in a single A-MPDU. In an embodiment, the first communication protocol specifies that a maximum of 256 MPDUs can be aggregated in a single A-MPDU. In another embodiment, the first communication protocol specifies another suitable maximum number of MPDUs that can be aggregated in a single A-MPDU.

In some embodiments, the data portion 240 additionally includes one or more padding portions (not illustrated), each of the one or more padding portions having one or more padding bits. For example, a respective padding portion is included with (e.g., appended to) each of at least some of the one or more MSDUs 256 in the data portion 240 to ensure that each of the at least some of MSDUs 256 has a length that is an integer multiple of four octets.

Referring back to FIG. 2A, each of the L-STF 205, the L-LTF 210, the L-SIG 215, the HE-SIG-A 220, the HE-SIG-B 222, the HE-STF 225, and the M HE-LTFs 230 comprises one or more OFDM symbols. The HE-SIG-A 220 and the HE-SIG-B 222 is each individually encoded to generate the respective number of OFDM symbols, in an embodiment. As merely an example, the HE-SIG-A 220 comprises two OFDM symbols, and the HE-SIG-B 222 comprises one OFDM symbol. As merely another example, the HE-SIG-A 220 comprises one OFDM symbol, and the HE-SIG-B comprises two OFDM symbols. As yet another example, the HE-SIG-A 220 comprises two OFDM symbols, and the HE-SIG-B 222 comprises a variable number of OFDM symbols. In an embodiment in which the HE-SIG-B 222 comprises a variable number of OFDM symbols, the particular number of HE-SIG-B 222 OFDM symbols in the data unit 200 is indicated in the HE-SIG-A 220. In some embodiments and/or scenarios the I-IE-SIG-B 222 is omitted.

In the embodiment of FIG. 2A, the data unit 200 includes one of each of the L-STF 205, the L-LTF 210, the L-SIG 215, the I-IE-SIG-A 220. In other embodiments in which a data unit similar to the data unit 200 occupies a cumulative bandwidth other than 20 MHz, each of the L-STF 205, the L-LTF 210, the L-SIG 215 and HE-SIG-A 220 is repeated over a corresponding number of 20 MHz sub-bands of the whole bandwidth of the data unit, in an embodiment. For example, the data unit occupies an 80 MHz bandwidth and, accordingly, includes four of each of the L-STF 205, the L-LTF 210, the L-SIG 215, the HE-SIG-A 220. In an embodiment in which a data unit similar to the data unit 200 occupies a cumulative bandwidth other than 20 MHz, the HE-SIG-B is repeated over a corresponding number of 20 MHz sub-bands of the whole bandwidth of the data unit. In another embodiment in which a data unit similar to the data unit 200 occupies a cumulative bandwidth other than 20 MHz, the HE-SIG-B 222 includes different channel-specific portions corresponding to different 20 MHz sub-bands of the whole bandwidth of the data unit, and the different channel specific portions are transmitted in parallel in the corresponding 20 MHz sub-bands of the whole bandwidth of the data unit 200.

In some embodiments, the modulation of different 20 MHz sub-bands signals is rotated by different angles. For example, in one embodiment, all OFDM tones within a first subband are rotated 0-degrees, all OFDM tones within a second subband is rotated 90-degrees, a third sub-band is rotated 180-degrees, and a fourth sub-band is rotated 270-degrees. In other embodiments, different suitable rotations are utilized. The different phases of the 20 MHz sub-band signals result in reduced peak to average power ratio (PAPR) of OFDM symbols in the data unit 200, in at least some embodiments. In an embodiment, if the data unit that conforms to the first communication protocol is an OFDM data unit that occupies a cumulative bandwidth such as 20 MHz, 40 MHz, 80 MHz, 160 MHz, 320 MHz, 640 MHz, etc., the HE-STF, the HE-LTFs, the IE-SIG-B and the HE data portion occupy the corresponding whole bandwidth of the data unit.

In an embodiment, the HE-SIG-A 220 and the HE-SIG-B 222 generally carry information about the format of the data unit 200, such as information needed to properly decode at least a portion of the data unit 200, in an embodiment. In an embodiment in which the data unit 200 is a multi-user data unit, HE-SIG-A 220 carries information commonly needed by multiple intended receivers of the data unit 200. In some embodiments, HE-SIG-A 220 additionally includes information for receivers that are not intended receivers of the data unit 200, such as information needed for medium protection. On the other hand, HE-SIG-B 222 carries user-specific information individually needed by each intended receiver of the data unit 200, in an embodiment. In an embodiment, HE-SIG-A 220 includes information needed to properly decode HE-SIG-B 222, and HE-SIG-B 222 includes information needed to properly decode data streams in the data portion 240 of the data unit 200, In some embodiments and/or scenarios, however, HE-SIG-A field 220 includes information needed to decode the data portion 240, and HE-SIG-B 222 is omitted from the data unit 200 in at least some such embodiments. In at least some embodiments and scenarios in which an AP (e.g., the AP 14) is the intended recipient of the data unit 200 (i.e., when the data unit 200 is an uplink data unit), information needed to properly decode the data portion of the data unit 200 is known a priori to the intended recipient of the data unit 200 and need not be included in the preamble of the data unit 200. In some such embodiments, the HE-SIG-B 222 is omitted from the data unit 200.

In some embodiments, specific information included in the HE-SIG-A 220 and/or in the HE-SIG-B 222 depends on the mode of transmission of the data unit 200. For example, in an embodiment, different information is included in the HE-SIG-A 220 when the data unit 200 is a downlink data unit as compared to information included in the HE-SIC-A 220 when the data unit 200 is an uplink data unit. Additionally or alternatively, different information is included in the HE-SIG-A 220 when the data unit 200 is a multi-user data unit as compared to information included in the HE-SIG-A 220 when the data unit 200 is a single-user data unit, in an embodiment. In another embodiment, different information is included in the HE-SIG-B 222 when the data unit 200 is a downlink data unit as compared to the information is included in the HE-SIG-B 222 when the data unit 200 is an uplink data unit.

In some embodiments, each of one or more of the fields 205-230 is repeated one or more times in the time domain. For example, the HE-SIGA field 220 is repeated one or more times in the time domain to increase transmission robustness and reliability of the HE-SIGA field 220. With continued reference to FIG. 2A, in some embodiments, the preamble 202 omits one or more of the fields 205-230. For example, the preamble 202 omits the HE-SIG-A 220 and/or the HE-SIG-B 222. In some embodiments, the preamble 202 includes additional fields not illustrated in FIG. 2A.

Figures 3A, 3B:
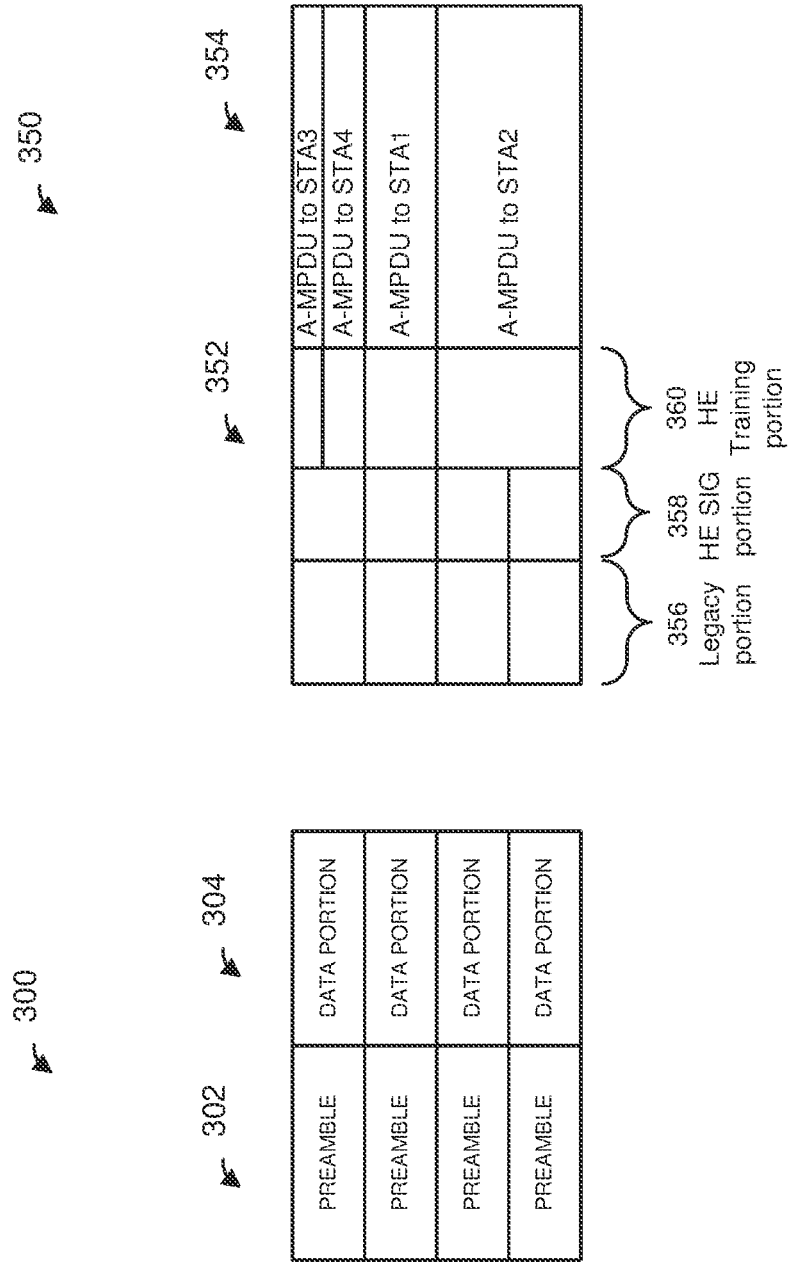

FIGS. 3A-3C are block diagrams of example PHY data units that occupy an 80 MHz bandwidth, according to embodiments. Referring first to FIG. 3A, a data unit 300 is generally similar to the data unit 200 of FIG. 2A. The data unit 300 includes a preamble portion 302 and a data portion 304. In an embodiment, the preamble portion 302 corresponds to a legacy preamble and conforms to a preamble format according to a legacy communication protocol, such as the IEEE 802.11a Standard, the IEEE 802.11n Standard, or the IEEE 802.11ac Standard, for example. In another embodiment, the preamble 302 corresponds to a non-legacy preamble that conforms to the IEEE 802.11ax Standard, for example. For example, in an embodiment, the preamble portion 302 includes a preamble such as the preamble 202 of FIG. 2A. At least some fields in the preamble portion 302 are duplicated in each 20 MHz bandwidth of the data unit 300. For example, the preamble portion 302 includes some or all of an L-STF field, an L-LTF field, an L-SIG field, an HE-SIG-A field, an HE-SIG-B field, an HE-STF field and IE-LTF fields such as the L-STF field 205, the L-LTF field 210, the L-SIG field 215, the HE-SIG-A field 220, the HE-SIG-B 222, the HE-STF 225, and IE-LTFs 230, respectively, and each of the L-STF field, the L-LTF field, the L-SIG field and the HE-SIG-A field, the HE-SIG-B field, the HE-STF field, and the IE-ITF fields is duplicated in each 20 MHz bands of the data unit 300. In an embodiment, at least some fields in the preamble portion 302 are different in different 20 MHz bands of the data unit 300. For example, at least a portion of an HE-SIG-B field, such as the HE-SIG-B field 222, is different (e.g., includes information) in different 20 MHz bands of the data unit 300, in an embodiment.

The data portion 304 of the data unit 300 is duplicated in each 20 MHz band of the data unit 300, in an embodiment, e.g. when the preamble portion 302 is a legacy preamble and is and duplicated in each 20 MHz band. In an embodiment, the data portion 304 includes a trigger data unit that triggers uplink OFDMA transmission by a plurality of client stations 25. In an embodiment, the trigger data unit includes information that indicates allocation of subchannels to be used for uplink OFDMA transmission, in an embodiment. The trigger data unit further indicates other transmission parameters to the multiple client stations 25, such as which modulation and coding scheme (MCS) each of the multiple client stations 25 should use, the OFDM numerology (e.g., guard interval, tone spacing, etc.) that each of the multiple client stations should use, transmit power that each of the multiple client stations 25 should use, etc. In an embodiment, the trigger data unit is a duplicate broadcast data unit transmitted to the multiple client stations 25 in each 20 MHz band of a legacy PHY data unit that generally conforms to a legacy communication protocol (e.g., IEEE 802.11a, IEEE 802.11n, IEEE 802.11ac communication protocol). In another embodiment, the trigger data unit is a broadcast data unit that occupies the entire 80 MHz bandwidth of a non-legacy PHY data unit that conforms to the first communication protocol (e.g., HE communication protocol). In yet another embodiment, the trigger data unit is aggregated with data in a downlink A-MPDU in each subchannel or each resource unit of the downlink A-MPDU.

Referring now to FIG. 3B, a data unit 350 is generally similar to the data unit 200 of FIG. 2A, in an embodiment. The data unit 350 includes a preamble portion 352 and a data portion 354. The preamble portion 352 includes a legacy portion 356, an HE signal field portion 358 and an HE training field portion 360. The legacy portion 356 includes an L-STF field, an L-LTF field and an L-SIG field such as the L-STF field 205, the L-LTF field 210, the L-SIG field 215, respectively, in an embodiment. The HE signal field portion 358 includes one or more HE signal fields such as the HE-SIG-A 220 and/or the HE-SIG-B 222, in an embodiment. The HE signal field portion 358 omits the IE-SIG-B 222, in some situations, in an embodiment. For example, the HE signal field portion 358 omits the HE-SIG-B 222 when the data unit 300 is an uplink data unit, in an embodiment. The HE training field portion 358 includes HE training fields such as the HE-STF 225 and the HE-LTFs 230, in an embodiment.

In an embodiment, the data portion 354 of the data unit 350 includes a plurality of aggregated MAC protocol data units (A-MPDU) respectively directed to ones of multiple client stations 25, where each A-MPDUs includes one or more MPDUs, with each of the one or more MPDUs including one or more MAC service data units (MSDUs) and/or aggregate MSDUs (A-MSDUs). In an embodiment, at least some of the A-MPDUs in the data portion 354 occupy subchannels that span a width of less than 20 MHz. For example, A-MPDU to (or from) STA3 and A-MPDU to (or from) STA4 each occupies a subchannel that spans a width of less than 20 MHz, in an embodiment. In an embodiment, the legacy portion 356 and the HE SIG portion 358 of the preamble 352 spans multiple data units that collectively occupy a 20 MHz bandwidth. On the other hand, the HE training portion 360 of the preamble 352 includes respective training field portions that occupy respective ones of the multiple subchannels in the 20 MHz bandwidths, in an embodiment.

In another embodiment, at least some of the A-MPDUs in the data portion 354 occupy subchannels that span a width of more than 20 MHz. As just an example, an A-MPDU in the data portion 354 occupies a subchannel that spans 40 MHz, in an embodiment. For example A-MPDU to (or from) STA2 in FIG. 3B spans a 40 MHz bandwidth, in an embodiment. In an embodiment, the legacy portion 356 and the HE SIG portion 358 of the preamble 352 is duplicated in each 20 MHz band of the 40 MHz bandwidth. On the other hand, the HE training portion 360 of the preamble 352 spans the entire 40 MHz bandwidth, in an embodiment.

The data unit 350 is a downlink OFDMA data unit transmitted by the AP to a plurality of client stations 25, in an embodiment. In another embodiment, respective A-MPDUs in the data portion 354 are transmitted by multiple client stations 25 as parts of an OFDMA transmission by multiple client stations 25. In an embodiment, an uplink data unit transmitted by a client station 25 includes the legacy preamble portion 354 and the IE signal field portion 356. Additionally, the uplink data unit transmitted by the client station 25 includes a portion of the HE training field portion 260 corresponding to the subchannel allocated for the uplink transmission by the client station 25. Referring briefly to FIG. 3C, an uplink data unit 370 is transmitted by STA4, in an embodiment. The uplink data unit 370 includes a preamble 372. The data unit 370 further includes a data portion 374. The data portion 374 includes a data unit (e.g., an A-MPDU) in the subchannel allocated to STA3, in an embodiment. In an embodiment, the preamble 372 includes the legacy portion 356 and the HE signal portion 358, in an embodiment. The preamble 372 additionally includes a portion of the HE training portion 360 that corresponds to the subchannel allocated to STA4. In the embodiment of FIG. 3C, the legacy portion 356 and the HE signal portion 358 is each repeated in multiple 20 MHz subbands of the bandwidth of the uplink data unit 370. In another embodiment, the legacy portion 356 and the HE signal portion 358 each occupies only one or more 20 MHz subbands of the data unit 370 that include the data portion 274. Thus, for example, the legacy portion 356 and the HE signal portion 358 each only the first 20 MHz subband that includes the A-MPDU from STA4, in an embodiment. Similarly, in an embodiment, the HE training portion 360 occupies one or more 20 MHz subbands of the data unit 370 that include the data portion 274. Thus, for example, the HE training portion 360 occupies the entire first 20 MHz subband of the data unit 370 that includes the A-MPDU from STA4, in an embodiment.

Figure 4:
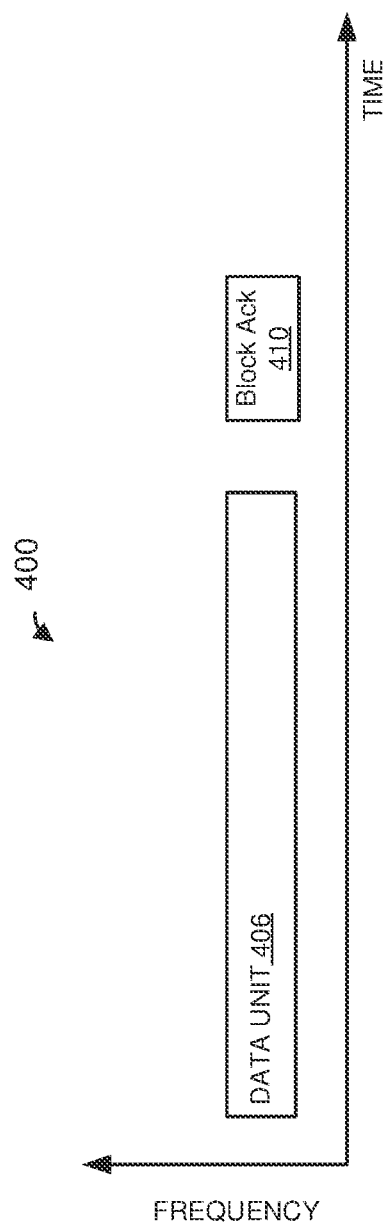
FIG. 4 is a block diagram of another example transmission sequence in a WLAN, according to another embodiment.

FIG. 4 is a block diagram of an example transmission sequence 400 in a WLAN such as the WLAN 10, according to an embodiment. The transmission sequence 400 includes transmission of a data unit 406. The data unit 406 is a single user data unit that includes data corresponding to a single client station 25, in an embodiment. In another embodiment, the data unit 406 is a multi-user data unit that includes respective data corresponding to multiple client stations 25. For example, the data unit 406 is an MU-MIMO and/or OFDMA data unit that includes respective data transmitted to respective client stations 25, or by respective client stations 25, in respective frequency portions and/or respective spatial streams allocated to the client stations 25. In an embodiment, the data unit 406 is a downlink data unit transmitted by the AP 14 to one or more client stations 25. In another embodiment, the data unit 406 is an uplink data unit that includes one or more data units simultaneously transmitted by one or more client stations 25 to the AP 14. In an embodiment in which the data unit 406 is an uplink data unit that includes one or more uplink data units simultaneously transmitted by one or more client stations 25, transmission of the one or more data units is triggered by a trigger data unit (not shown in FIG. 4) transmitted by the AP 14 to the one or more client stations 25 to trigger transmission of the one or more data units by the one or more client stations 25. In an embodiment, the data unit 406 corresponds to the data unit 200 of FIG. 2A. In another embodiment, the data unit 406 corresponds to the data unit 300 of FIG. 3A or the data unit 350 of FIG. 3B In another embodiment, the data unit 406 is a suitable data unit different from the data unit 200 of FIG. 2A, the data unit 300 of FIG. 3A and the data unit 350 of FIG. 3B.

Upon receiving the data unit 406, a receiving device transmits an acknowledgement data unit 410 to acknowledge receipt of data in the data unit 406. Thus, for example, in an embodiment in which the data unit 406 is a single user downlink data unit transmitted by the AP 14 to a client station 25 (e.g., the client station 25-1), the acknowledgement data unit 410 is transmitted by the client station 25-1 to the AP 14 to acknowledge receipt of the data unit 406 by the client station 25-1. As another example, in an embodiment in which the data unit 406 a multi user downlink data unit transmitted by the AP 14 to multiple client stations 25, the acknowledgement data unit 410 includes respective acknowledgement data units transmitted by the multiple client stations 25. As yet another example, in an embodiment in which the data unit 406 is a single user uplink data unit transmitted by the client station 25-1 to the AP 14, the acknowledgement data unit 410 is transmitted by the AP 14 to the client station 25-1. As still another example, in an embodiment in which the data unit 406 is a multi-user uplink data unit that includes respective data units transmitted by multiple client stations 25, the acknowledgement data unit 410 is transmitted by the AP 14 to the multiple client stations 25 and includes respective acknowledgement data corresponding to respective ones of the multiple client stations 25.

In an embodiment, the data unit 406 is an A-MPDU that aggregates multiple MPDUs (each having one or more MSDUs) and/or A-MSDUs, and the acknowledgement data unit 410 is a block acknowledgement (Block Ack) data unit that includes respective acknowledgement information for respective ones of the multiple MPDUs aggregated in the A-MPDU. Accordingly, the data unit 406 is sometimes referred to herein as A-MPDU 406, and the acknowledgement data unit 410 is sometimes referred to herein as a Block Ack 410. In an embodiment, the Block Ack 410 is of variable length. The particular length of the Block Ack 410 is determined by a maximum number of MPDUs that potentially need to be acknowledged by the Block Ack 410, in an embodiment. As discussed above with respect to FIG. 2B, in an embodiment, the first communication protocol defines a maximum number (e.g., 256 or another suitable maximum number) of MPDUs that can be aggregated into a single A-MPDU. However, in some situations, a number of MPDUs that can potentially be aggregated in the A-MPD 406 is less than the maximum number of MPDUs defined for a single A-MPDU by the first communication protocol. For example, a device that transmits the A-MPDU 406 may have an insufficient amount of buffer memory to buffer block acknowledgement information expected to be received from the device that receives and acknowledges the A-MPDU 406 if the supported maximum number of MPDUs were aggregated into the A-MPDU 406. Thus, the maximum number of MPDUs that can be aggregated in the A-MPDU 406 is less than the maximum supported number of MPDUs, in an embodiment.

In an embodiment, the Block Ack 410 includes a bitmap in which respective bits indicate successful or unsuccessful receipt of respective ones of the multiple MPDUs aggregated in the A-MPDU 406. In an embodiment, in at least some scenarios, the maximum number of MPDUs that can be included in a single A-MPDU transmitted from the AP 14 to a particular client station 25 (or vise-versa) may be less than a maximum number of MPDUs in a single A-MPDU supported by the first communication protocol. For example, in an embodiment, the maximum number of MPDUs that can be included in a single A-MPDU transmitted from the AP 14 to a particular client station 25 (or vise-versa) is negotiated between the AP 14 and the client station 25. Then, in the case that the negotiated maximum number of MPDUs in less than the supported maximum number of MPDUs, acknowledgement data units from the client station 25 to the AP 14 (or vice versa) include relatively shorter bitmaps to acknowledge the negotiated number of MPDUs, in at least some situations, in an embodiment. As just an example, in an embodiment in which the first communication protocol supports aggregation of a maximum of 256 MDPUs in a single A-MPDU, but the data unit 406 can include a maximum number of MPDUs that is less than 256 MPDUs (e.g., 128 MPDUs, 64 MPDUs, 32 MPDUs, or another suitable maximum number of MPUs less than 256 MPDUs), the bitmap included in the block acknowledgement 410 includes a number of bits that is less than 256 bits corresponding to the maximum number of MPDUs that can be included in the data unit 406. In an embodiment, the length of the bitmap in the acknowledgement data unit 410 is selected from a plurality of predetermined possible lengths of the bitmap.

For example, the length of the bitmap is selected from a plurality of possible numbers of bits included in the bitmap, wherein the possible numbers of bits are 256 bits, 128 bits, 64 bits, 32 bits.

In an embodiment, a length of the bitmap included in the block acknowledgement 410 is determined by the particular number of MPDUs that are included in the A-MPDU 406 being acknowledged by the block acknowledgement 410. For example, in an embodiment in which a number of bits of the bitmap in the acknowledgement data unit 410 is selected from a plurality of possible numbers of bits (e.g., 256 bits, 128 bits, 64 bits, 32 bits), the number of bits is selected such that the number of bits is the smallest number of bits, of the plurality of possible numbers of bits, that is greater than or equal to the particular number of MPDUs included in the A-MPDU 406 being acknowledged by the acknowledgement data unit 410.

In an embodiment, negotiation between devices (e.g., between the AP 14 and a client station 25) occurs during a block acknowledgement setup procedure, such as an ADDBA negotiation procedure, between two devices and prior to transmission of data between the devices. The block acknowledgement setup procedure includes a frame exchange that includes transmission of an request frame (e.g., ADDBA Request) from a first communication device (e.g., the AP 14) to a second communication device (e.g., a client station 25) and subsequent transmission of a response frame (e.g. an ADDBA Response) from the second communication device to the first communication device, in an embodiment. In an embodiment, a maximum number of MPDUs that can be aggregated into a single A-MPDU is limited by a buffer size, or the number of buffers available and/or allocated for receiving block acknowledgements, at a receiving device. In an embodiment, therefore, a negotiated buffer size determines a number of MPDUs for each of a plurality traffic classes that can be aggregated into a single A-MPDU. For example, in an embodiment in which a negotiated buffer size allows for 256 MPDUs to be aggregated into a single A-MPDU and the first communication protocol supports 8 traffic classes, the transmitting device may include a maximum of 256 MPDUs for each of 8 classes. Accordingly, a single A-MPDU can include a maximum of 256*8=2048 MPDUs, in this embodiment. In another embodiment, a negotiated buffer size determines a maximum number of MPDUs that can be aggregated into a single A-MPDU regardless of the traffic classes of MPDUs. Thus, for example, in an embodiment in which a negotiated buffer size allows for 256 MPDUs to be aggregated into a single A-MPDU and the first communication protocol supports 8 traffic classes, the transmitting device may include a maximum of 256 MPDUs across all 8 classes, in an embodiment. In yet another embodiment, a first buffer size is negotiated for single TID data units and a second buffer size is negotiated for multi-TID data units.

In an embodiment, a maximum number of MPDUs of a particular traffic class that can be included in a single-TID data unit is the same as the number of MPDUs of the particular traffic class that can be included in a multi-TID data unit. Accordingly, in this embodiment, a single buffer size is negotiated in a block acknowledgement setup (e.g., ADDBA) procedure. In an embodiment, each of the request frame (e.g., ADDBA request) and the response frame (e.g., ADDBA response) in the frame exchange performed during the ADDBA procedure includes a single buffer size field for a particular traffic class being negotiated during the ADDBA procedure.

In another embodiment, the maximum number of MPDUs of a particular traffic class that can be included in a single-TID data unit and the number of MPDUs of the particular traffic class that can be included in a multi-TID data unit is not necessarily the same. For example, in an embodiment, each of the request frame (e.g., ADDBA request) and the response frame (e.g., ADDBA response) in the frame exchange performed during the block acknowledgement setup (e.g., ADDBA) procedure for a particular traffic class includes a first buffer size field to negotiate a buffer size for a single-TID A-MPDU and a second buffer size field to negotiate a buffer size for a multi-TID A-MPDU. In another embodiment, each of the each of the request frame (e.g., ADDBA request) and the response frame (e.g., ADDBA response) in the frame exchange performed during a block acknowledgement setup (e.g., ADDBA) procedure for a particular traffic class a buffer size field and a scale factor field. In this embodiment, the buffer size field is used to negotiate a buffer size that defined a number maximum number of MPDUs of the particular traffic class that can be included in a single-TID A-MPDU, and the scale factor field is set to a value by which to scale the size indicated in the buffer size field to determine a buffer size for a multi-TID A-MPDU and to determine a corresponding maximum number of MPDUs of the particular traffic class that can be included in a multi-TID A-MPDU.

In an embodiment, a maximum A-MPDU length is announced by a receiving device (e.g., the AP 14 or a client station 25). For example, in an embodiment, the AP 14 and/or the client station 25 transmits a management data unit, such as a beacon data unit (also referred to herein as "a beacon frame"), an association request data unit, a re-association request data unit, an association response data unit, a re-association response data unit, a probe request data unit, a probe response data unit, or another suitable data unit, wherein the management data unit includes an indication of a maximum length A-MPDU supported by the device. For example, a maximum A-MPDU length exponent field is included in the management data unit. The maximum A-MPDU length exponent field is included in a first capabilities element included in the management data unit, wherein the first capabilities element is defined by a legacy communication protocol, in an embodiment. For example, the first capabilities element is a VHT capabilities element defined by the IEEE 802.11ac Standard or the HT capabilities element defied by the IEEE 802.11n Standard, in various embodiments. The value of the A-MPDU length exponent field is used at a transmitting device to determine a maximum A-MPDU length supported by the receiving device. In an embodiment, the maximum A-MPDU length supported by the receiving device is determined by $2^{13+Maximum\ A\text{-}MPDU\ length\ exponent}-1$, where Maximum A-MPDU length exponent is the value of the A-MPDU length exponent field in the first capabilities element. In an embodiment, the Maximum A-MPDU length field in the first capabilities element comprises three bits, and the value Maximum A-MPDU length exponent field in the first capabilities element is in the range of 0 to 7. Accordingly, the value Maximum A-MPDU length exponent field in the first capabilities element specifies a maximum A-MPDU length of up to $2^{20}$ bytes (i.e., up to 1,048,576 bytes). In other embodiments, the Maximum A-MPDU length field in the first capabilities element comprises fewer than or greater than three bits and/or the value Maximum A-MPDU length exponent in the first capabilities element specifies a maximum A-MPDU length of other than up to $2^{20}$ bytes.

In an embodiment, in order to specify a maximum A-MPDU length greater than the maximum value that can be specified by the Maximum A-MPDU length exponent field in the first capabilities element (e.g., greater than $2^{20}$ bytes), the receiving device transmits an additional A-MPDU maximum exponent field, for example by including the additional A-MPDU maximum exponent field in a second capabilities element of a management frame. In an embodiment, the second capabilities element is an HE capabilities element defined by the first communication protocol. In an embodiment, the maximum A-MPDU length exponent field in the second capabilities element comprises three bits. In another embodiment, the maximum A-MPDU length exponent field in the second capabilities element comprises fewer than or greater than three bits. In an embodiment, the maximum A-MPDU length exponent field in the second capabilities element is set to identify one of multiple predetermined exponents, such as an exponent from among 20, 21 and 22. In an embodiment in which the maximum A-MPDU length exponent field in the second capabilities element comprises three bits and the field is used to indicate one of three predetermined exponent values, three values of the three bits (e.g., 0, 1 and 2) are respectively defined to indicate the three predetermined exponent values and the remaining values (e.g., 3-7) of the three bits are reserved. In another embodiment, in which the maximum A-MPDU length exponent field in the second capabilities element comprises three bits, a suitable number of values of the three bits greater than three values (e.g., 4 values, 5 values, etc.) or fewer than three values (e.g., 2 values) are respectively defined to indicate respective predetermined exponent values and the remaining values are reserved. As a more specific example, four values (e.g., 01, 2, 3) are respectively defined to indicate four predetermined values and the remaining values (e.g., 4-7) are reserved. In other embodiments, the maximum A-MPDU length exponent field in the second capabilities element comprises a suitable number of bits greater than three bits (e.g., 4 bits, 5 bits) or fewer than three bits (e.g., 1 bit, 2 bits), and at least some of respective values of the number of bits greater than three bits or fewer than three bits are respectively defined to indicate respective predetermined exponent values. In an embodiment, the particular exponent indicated in the A-MPDU length exponent field in the second capabilities element signifies that the maximum A-MPDU length supported by the device is $2^{20+\text{Maximum A-MPDU length exponent}}-1$, where Maximum A-MPDU length exponent is the value of the A-MPDU length exponent field in the second capabilities element.

In an embodiment, the A-MPDU maximum length exponent field in the second capabilities element is used by the transmitting device in combination with A-MPDU maximum length exponent field in the first capabilities element to determine the maximum A-MPDU length supported by the receiving device. For example, if the value of the A-MPDU maximum length exponent field in the first capabilities element is less than 7, then the transmitting device determines the maximum A-MPDU length supported by the receiving device according to $2^{13+\text{Maximum A-MPDU length exponent}}-1$, where Maximum A-MPD U length exponent is the value of the A-MPDU length exponent field in the first capabilities element. In this case, the A-MPDU length exponent field in the second capabilities element is reserved, in an embodiment. On the other hand, if the value of the A-MPDU maximum length exponent field in the first capabilities element is equal to 7, then the transmitting device determines the maximum A-MPDU length supported by the receiving device according to $2^{20+\text{Maximum A-MPDU length exponent}}-1$, where Maximum A-MPDU length exponent is the value of the A-MPDU length exponent field in the second capabilities element.

Figure 5:
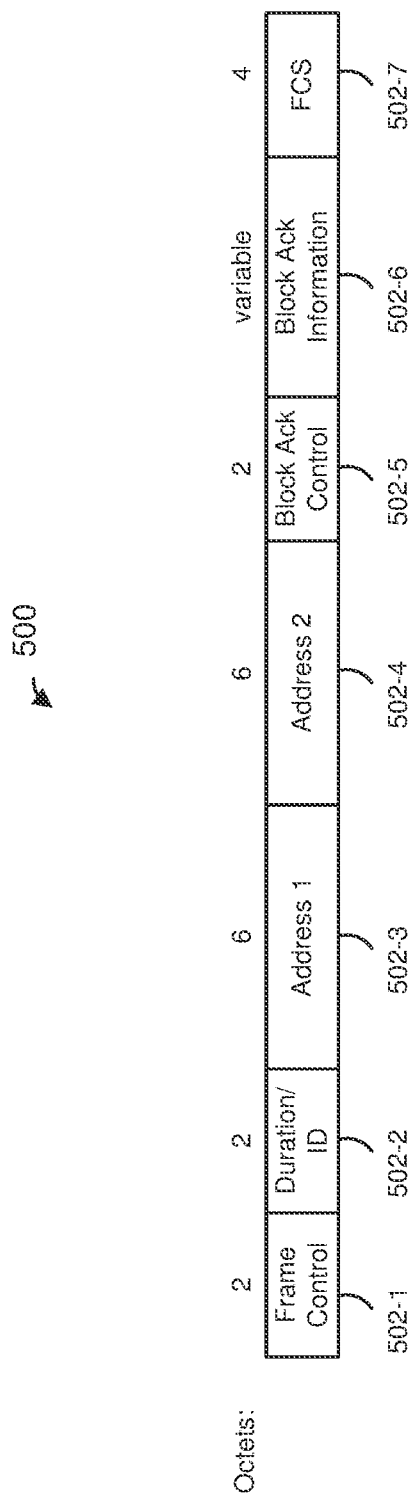
FIG. 5 is a block diagram of an example acknowledgement data unit, according to an embodiment.

FIG. 5 is a block diagram of an example acknowledgement data unit 500 included in an acknowledgement data unit, according to an embodiment. In an embodiment, the acknowledgement data unit 500 is included in the acknowledgement data unit 410 of FIG. 4. In another embodiment, the acknowledgement data unit 500 is included in a suitable data unit different from the acknowledgement data unit 410 of FIG. 4. Similarly, the acknowledgement data unit 410 of FIG. 4 includes an acknowledgement data unit different from the acknowledgement data unit 500, in some embodiments. The acknowledgement data unit 500 includes a plurality of fields 502. In the embodiment illustrated in FIG. 5, the fields 502 include a data unit control field 502-1, a duration/id field 502-2, a first address (e.g. receiver address) field 502-3, a second address (e.g., transmitter address) field 502-4, a Block Ack control field 502-5, a Block Ack information field 502-6, and a data unit sequence check (FCS) field 502-7. The number indicated in FIG. 5 above each of the fields 502 indicates the number of octets of bits in the corresponding field 502, according to an example embodiment.

The first address (address 1) field 502-3 includes an address of an intended receiver of the acknowledgement data unit that includes the control field 500, in an embodiment. In an embodiment and/or scenario in which the control field 500 is included in a unicast acknowledgement data unit directed to only one client station 25, the first address field 502-3 includes a unicast address, such as a unicast MAC address, corresponding to the one client station 25. On the other hand, in an embodiment and/or scenario in which the control field 500 is included in a broadcast acknowledgement data unit directed to multiple client stations 25, the first address field 502-3 includes a broadcast address, such as a broadcast MAC address, to indicate that the acknowledgement data unit is directed to multiple client stations 25.

Figure 6:
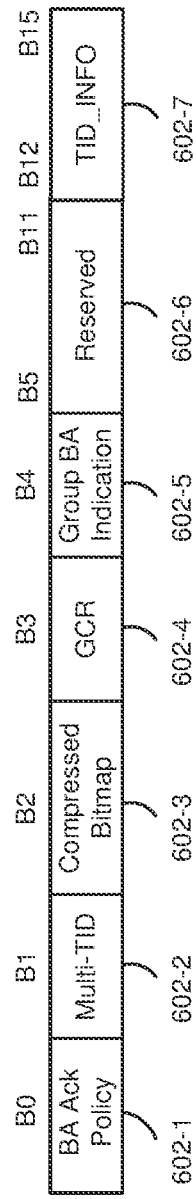
FIG. 6 is a block diagram of an example control field of an acknowledgement data unit, according to an embodiment.

FIG. 6 is a block diagram illustrating bit allocation of a Block Ack control field 600 included in an acknowledgement data unit, according to an embodiment. The Block Ack control field 600 corresponds to the Block Ack control field 502-5, in an embodiment. The Block Ack control field 600 includes a plurality of subfields 602. The subfields 602 collectively comprise 16 bits, in the illustrated embodiment. The subfields 602 collectively comprise a suitable number of bits different than 16 bits, in other embodiments. In the embodiment illustrated in FIG. 6, the Block Ack control field 600 includes a BA Ack policy subfield 602-1, a multi-TID subfield 602-2, a compressed bitmap subfield 602-3, a GroupCast with Retries (GCR) subfield 602-4, a group BA indication subfield 602-5, a reserved subfield 602-6, and a TID information subfield 602-7. Bit allocation for each of the subfields 602, according to an example embodiment, is illustrated in FIG. 6 above the corresponding subfields 602.

In an embodiment, the group BA indication subfield 602-5 indicates whether the acknowledgement data unit that includes the BA control field 600 includes a single acknowledgement to acknowledge a single data unit received from one client station 25 or includes multiple acknowledgements to acknowledge multiple data units received from multiple client stations 25, for example as parts of an MU-MIMO uplink transmission from the multiple client stations 25 or an OFDMA transmission from the multiple client stations 25. In an embodiment, the group BA indication field 602-5 serves as an additional indication to indicate whether the acknowledgement data unit that includes the BA control field 600 includes a single acknowledgement directed to one client station 25 or multiple acknowledgements directed to multiple client stations 25, in addition to the indication provided by the RA field 502-3 as discussed above with respect to FIG. 5. In another embodiment, the group BA indication subfield 602-5 is omitted from the BA control field 600, and the RA field 502-3 is instead relied upon to indicate whether the acknowledgement data unit that includes the BA control field 600 includes a single acknowledgement directed to one client station 25 or multiple acknowledgements directed to multiple client stations 25.

Figure 7:
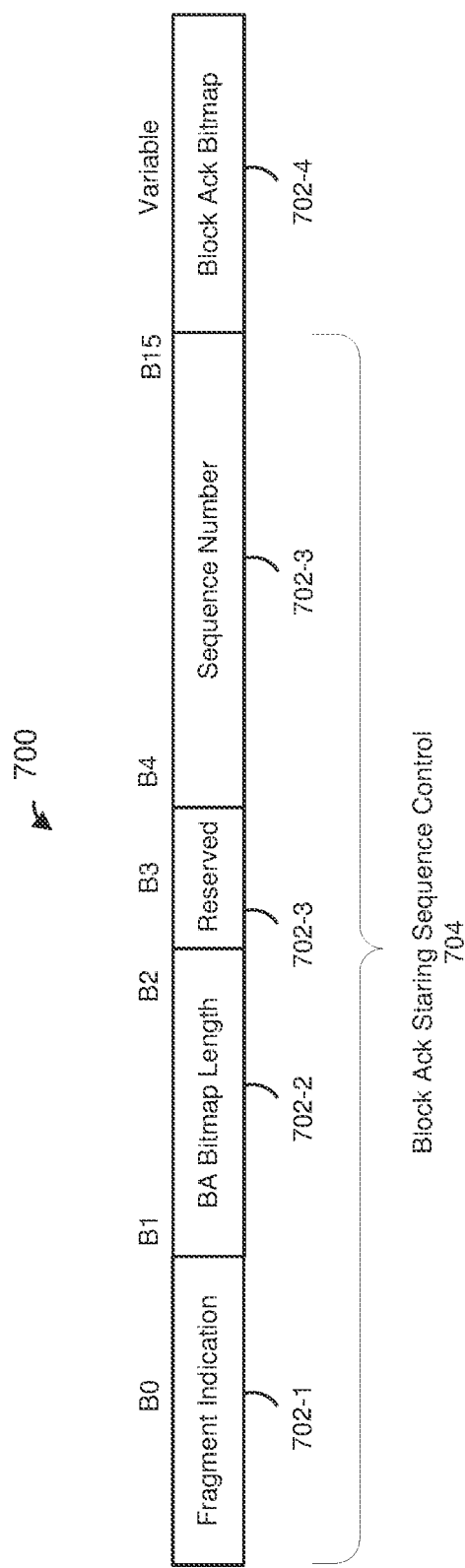
FIG. 7 is a block diagram of an example information field included in an acknowledgement data unit, according to an embodiment.

FIG. 7 is a block diagram of a Block Ack information field 700, according to an embodiment. In an embodiment, the Block Ack information field 700 corresponds to the Block Ack information field 502-6 of the acknowledgement data unit 500 of FIG. 5. The Block Ack information field 700 includes a plurality of subfields 702. In the embodiment illustrated in FIG. 7, the subfields 702 include a fragment indication subfield 702-1, a Block Ack bitmap length subfield 702-1, a reserved subfield 702-2, a sequence number subfield 702-3, and a Block Ack bitmap subfield 702-4. The fragment indication subfield 702-1, the Block Ack bitmap length subfield 702-1, the reserved subfield 702-2, the sequence number subfield 702-3 collectively form a Block Ack starting sequence control field 704.

In an embodiment, the sequence number subfield 702-3 indicates a sequence number corresponding to the first one of the data units being acknowledged, and each bit of the Block Ack bitmap subfield 702-4 acknowledges a data unit with a sequence number that equals the sequence number indicated by the sequence number subfield 702-3 plus the index of the bit, in an embodiment. Thus, for example, the first bit (bit index 0) of the Ack bitmap subfield 702-4 acknowledges the data unit with the sequence number indicated by the sequence number subfield 702-3, the second bit (bit index 1) of the Block Ack bitmap subfield 702-4 acknowledges the data unit with a sequence number indicated by the sequence number subfield 702-3 plus 1, etc., in an embodiment. In an embodiment, the value of each bit of Block Ack bitmap subfield 702-4 indicates whether the corresponding data unit was successfully received. For example, a value of logic one (1) of a bit of Block Ack bitmap subfield 702-4 indicates that the corresponding data unit was successfully received, and a value of logic zero (0) of a bit of Block Ack bitmap subfield 702-4 indicates that the corresponding data unit was not successfully received (e.g., not received or received with an error).

In an embodiment, the Block Ack bitmap subfield 702-4 is of variable length. In an embodiment, the length of the Block Ack bitmap subfield 702-4 depends on a maximum length of the A-MPDU being acknowledged by the Block Ack information field 700. For example, in an embodiment, the Block Ack bitmap subfield 702-4 includes a number of bits corresponding to a maximum number of MPDUs that can be included in the A-MPDU being acknowledged by the Block Ack information field 700. The Block Ack Bitmap Length subfield 702-1 indicates the length of the Block Ack bitmap subfield 702-4. In an embodiment, the Block Ack bitmap length subfield 702-1 includes one or more bits set to a value that indicates a particular length of a plurality of predetermined lengths. In an embodiment, for example, the bitmap length indication includes two bits for indicating a particular one of four predetermined lengths of, e.g., 32 octets, 16 octets, 8 octets, and 4 octets (i.e., 256 bits, 128 bits, 64 bits, and 32 bits, respectively). In other embodiments, other suitable numbers of pluralities of predetermined lengths (e.g., two different lengths, eight different lengths, etc.) and/or other values of the predetermined lengths are utilized. In an embodiment, the particular one of the predetermined lengths is selected based on the number of MPDUs that were included in the A-MPDU being acknowledged. For example, a smallest one of the predetermined lengths that is greater than or equal to the number of MPDUs that were included in the A-MPDU being acknowledged is selected. The length of the Block Ack bitmap subfield 702-4 is less than the buffer size defined during block acknowledgment negotiation (e.g., ADDBA negotiation), in some embodiments.

Figure 8:
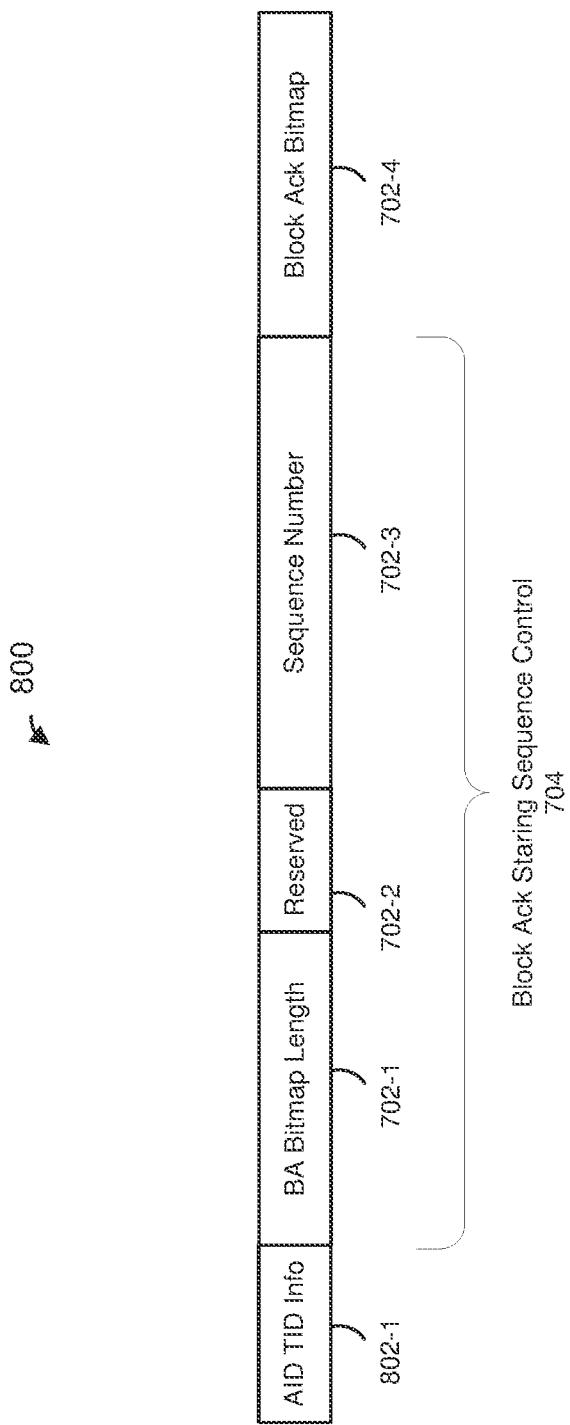
FIG. 8 is a block diagram of another example information field included in an acknowledgement data unit, according to another embodiment.

FIG. 8 is a block diagram of an AID TID Block Ack information field 800 included in a Block Ack information field of an acknowledgement data unit, according to an embodiment. In an embodiment, respective one or more AID TID Block Ack information fields 800 are included in a Block Ack information field of an acknowledgement data unit to acknowledge an A-MPDU that includes MPDUs corresponding to each of one or more devices (e.g., one or more client stations 25) and/or each of one or more traffic classes. The AID TID Block Ack information field 800 is generally the same as the Block Ack information field 700 of FIG. 7 and includes some or all of the same subfields 702 as the Block Ack information field 700 of FIG. 7, in an embodiment. The AID TID Block Ack information field 800 additionally includes an AID TID information subfield 802-1. In an embodiment, the AID TID information subfield 802-1 indicates the particular client station and/or the particular traffic class to which the AID TID Block Ack information element 800 corresponds, and the Block Ack Bitmap subfield 702-4 includes a bitmap set to indicates successful or unsuccessful reception of one or more MPDUs of the particular client station and/or the particular traffic class. In an embodiment, the per AID TID information subfield 802-1 includes 16 bits (i.e., two bytes). In another embodiment, the per AID TID information subfield 802-1 includes a suitable number of bits other than 16 bits.

Figure 9:
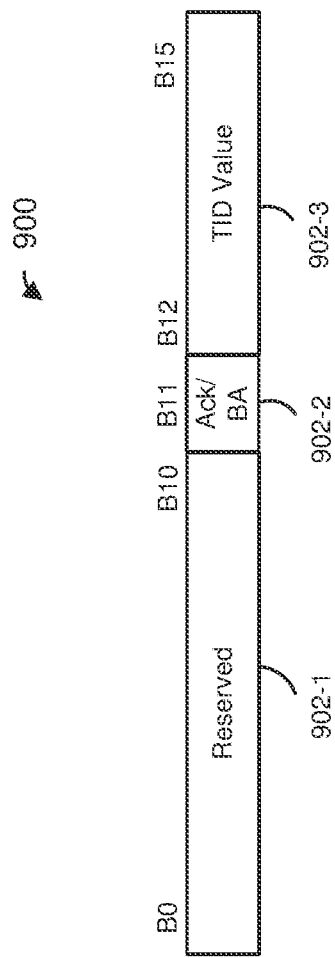
FIG. 9 is a block diagram of an example identifier information subfield included in an information field of an acknowledgement data unit, according to an embodiment.

FIG. 9 is a block diagram of an AID TID Block Ack information subfield 900 corresponding to the AID TID Block Ack information subfield 802-1, in an embodiment. In an embodiment, the AID TID Block Ack subfield 900 is included in a single user acknowledgement data unit used to acknowledge an A-MPDU of a single device (e.g., a single client station 25), wherein the A-MPDU can include MPDUs of multiple traffic classes. The AID TID Block Ack information element 900 includes reserved bits 902-1 and an Ack/BA subfield 902-2 a TID value subfield 902-3. The Ack/BA subfield 902-2, in an embodiment, comprises one bit that is set to indicate whether the AID TID information field that includes the AID TID Block Ack information subfield 900 includes i) a single acknowledgement to acknowledge a single data unit of a traffic class to which the per-TID Block Ack information element 900 corresponds or ii) a block acknowledgement to acknowledge multiple data unit of the traffic class to which the per-TID Block Ack information element 900 corresponds. The TID value subfield 902-3 comprises four bits, in an embodiment. In other embodiments, the TID value subfield 902-3 comprises other suitable numbers of bits. The ID value subfield 902-3 is set to a value that indicates the traffic class to which the per-TID Block Ack information element 900 corresponds, in an embodiment. In an embodiment, when the Ack/BA subfield 902-2 indicates that the AID TID information field includes a single acknowledgement to acknowledge a single data unit of the traffic class, then the AID TID information field omits a sequence number subfield (e.g., the sequence number subfield 702-3 in FIGS. 7 and 8) and a Block Ack bitmap subfield (e.g., the Block Ack Bitmap subfield 702-4 in FIGS. 7 and 8). On the other hand, when the Ack/BA subfield 902-2 indicates that the AID TID information field includes a block acknowledgement to acknowledge multiple data unit of the traffic class, then the AID TID information field includes a sequence number subfield (e.g., the sequence number subfield 702-3 in FIGS. 7 and 8) and a Block Ack bitmap subfield (e.g., the Block Ack Bitmap subfield 702-4 in FIGS. 7 and 8).

Figure 10:
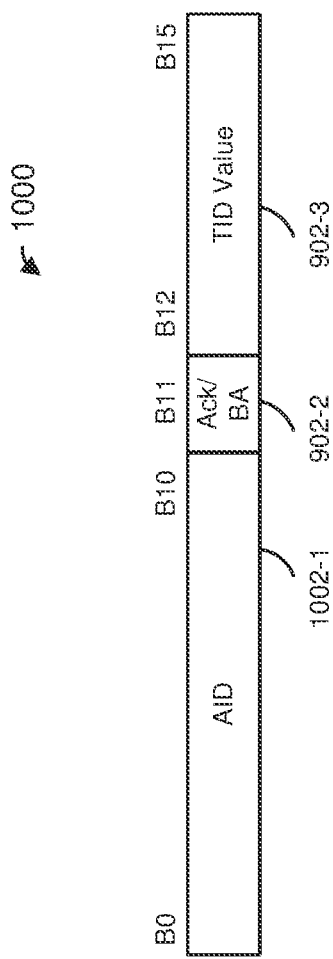
FIG. 10 is a block diagram of an example identifier information subfield included in an information field of an acknowledgement data unit, according to another embodiment.

FIG. 10 is a block diagram of an AID TID Block Ack information subfield 1000 corresponding to the AID TID Block Ack information subfield 802-1, in another embodiment. In an embodiment, the AID TID Block Ack information subfield 1000 is included in a multi user acknowledgement data unit used to acknowledge respective A-MPDUs of multiple devices (e.g., multiple client stations 25), wherein each A-MPDU can include MPDUs of multiple traffic classes. The AID TID Block Ack information subfield 1000 is generally the same as the AID TID Block Ack information subfield 900 of FIG. 9 except that at least some of the reserved bits 902-1 in the AID TID Block Ack information subfield 900 of FIG. 9 are replaced with a device identifier subfield 1002-1 in the AID TID Block Ack information subfield 1000. In an embodiment, the device identifier subfield 1002-1 comprises 10 bits. In another embodiment, the device identifier subfield 1002-1 comprises another suitable number of bits. In an embodiment, the device identifier subfield 1002-1 includes an association identifier (AID) of a client station to which the AID TID Block Ack information subfield 1000 corresponds. In another embodiment, the device identifier subfield 1002-1 includes a partial AID of the client station to which the AID TID Block Ack information subfield 1000 corresponds. In other embodiments, the device identifier subfield 1002-1 includes another suitable identifier of the client station to which the AID TID Block Ack information subfield 1000 corresponds.

Figure 11:
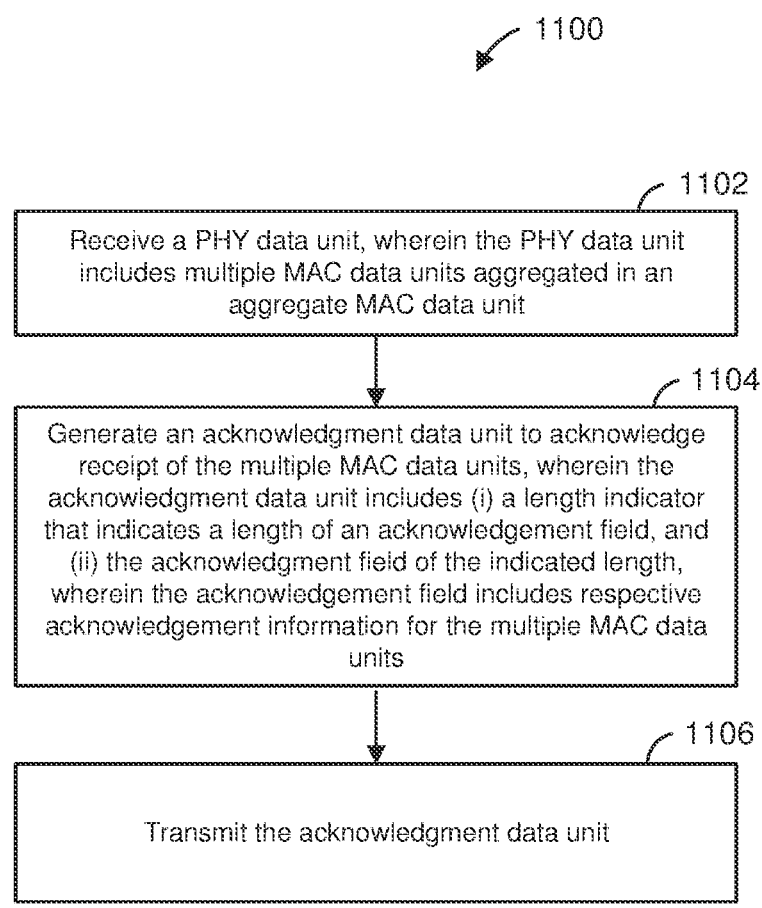
FIG. 11 is a flow diagram of an example method for acknowledging data units in a wireless local area network, according to an embodiment.

FIG. 11 is a flow diagram of an example method 1100 for acknowledging data units in a wireless local area network, according to an embodiment. In an embodiment, the method 1100 is implemented by a first communication device. The first communication device is an AP such as the AP 14 or a client station such as the client station 25-1, for example, in various embodiments. For example, the method 1100 is implemented by the MAC processor 18 and/or by the PHY processor 20 of the AP 14, in an embodiment. As another example, the method 1100 is implemented by the MAC processor 28 and/or by the PHY processor 29 of the client station 25-1, in another embodiment. In other embodiments, the method 1100 is implemented by other suitable communication devices.

At block 1102, a PHY data unit is received. In an embodiment, the data unit 200 of FIG. 2A is received. In another embodiment, one of the data units 300 of FIG. 3A, 350 of FIG. 3B or 370 of FIG. 3C is received. In other embodiments, other suitable PHY data units are received. The PHY data unit includes multiple MAC data units aggregated in an aggregate MAC data unit, in an embodiment. For example, the multiple MAC data units aggregated in an aggregate MAC data unit included in a data portion of the PHY data unit, in an embodiment.

At block 1104, an acknowledgement data unit to acknowledge receipt of the multiple MAC data units. In an embodiment, the acknowledgement data unit 500 of FIG. 5 is generated. In another embodiment, a suitable acknowledgement data unit different from the acknowledgement data unit 500 of FIG. 5 is generated. In an embodiment, the acknowledgement data unit includes an acknowledgement field of a variable length. For example, the data unit includes a bitmap of a variable length, in an embodiment. The particular length of the acknowledgement field is determined based at least in part on a maximum number of MAC data units that can be included in the PHY data unit received at block 1102, in an embodiment. In an embodiment, the acknowledgement data unit additionally includes a length indication that indicates the length of the acknowledgement field.

In some embodiments, the multiple MAC data units aggregated in the aggregate MAC data unit included in the PHY data unit received at block 1102 correspond to multiple traffic classes. The acknowledgement data unit generated at block 1104 includes, for each one of the multiple traffic classes, (i) a respective length indication that indicates a respective length of an acknowledgement field corresponding to the traffic class, and (ii) a respective acknowledgment field of the corresponding length, the wherein the respective acknowledgement field includes respective acknowledgement information for multiple MAC data units of the traffic class, in some such embodiments.

At block 1106, the acknowledgement data unit is transmitted to a communication device from which the PHY data unit was received at block 1102.

In some embodiments, the first communication protocol supports aggregation of a greater maximum number of MPDUs in a single A-MPDU as compared to the maximum number of MPDUs that can be aggregated in a single A-MPDU according to a legacy communication protocol. In some embodiments, an acknowledgement data unit includes multiple AID TID Block Ack information fields corresponding to a particular communication device (e.g., a particular client station 25) that conforms to the first communication protocol to acknowledge the greater number of maximum MPDUs aggregated in a single A-MPDU in accordance with the first communication protocol. In an embodiment, multiple AID TID Block Ack information fields corresponding to the particular communication device are used to acknowledge MPDUs of a particular traffic class received in an A-MPDU from the particular communication device. The multiple AID TID Block Ack information fields included in the acknowledgement data unit are used to acknowledge respective subsets of the MPDUs of the particular traffic class received in the A-MPDU from the particular communication device, in an embodiment. An acknowledgement data unit that includes multiple AID TID Block Ack information fields is suitable for use, for example, in an embodiment in which a number of MPDUs of a particular traffic class received in an A-MPDU from a particular client station that conforms to the first communication protocol exceeds the maximum number of MPDUs that can be acknowledged by a single AID TID Block Ack information field, such as a single AID TID Block Ack information field that conforms to a legacy communication protocol.

Figure 12:
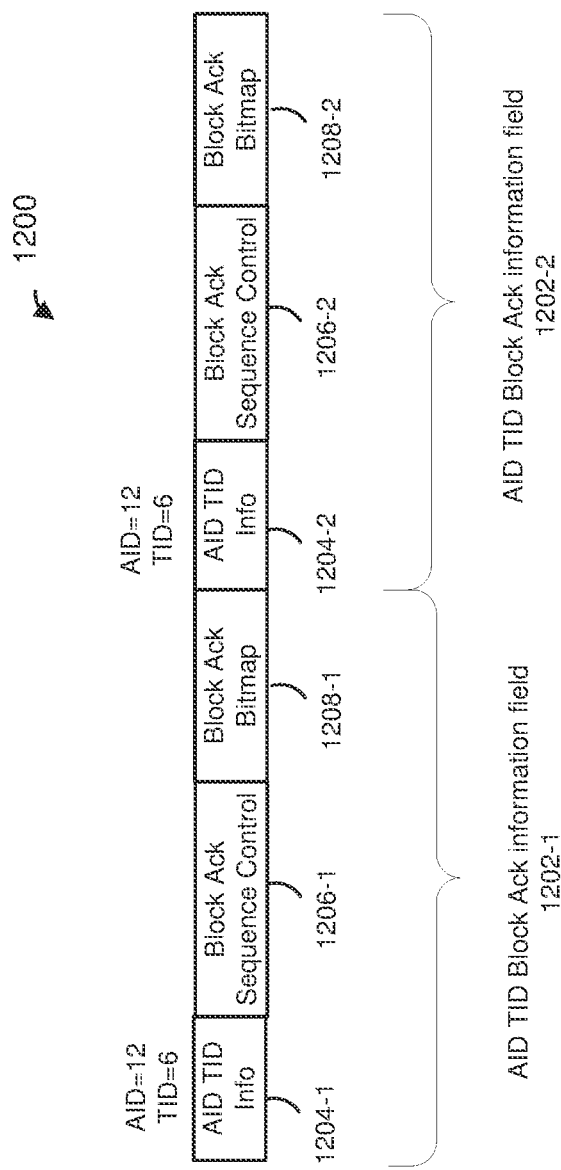
FIG. 12 is a block diagram of an acknowledgement information field included in an acknowledgement data unit, according to another embodiment.

FIG. 12 is a block diagram of a Block Ack information field 1200 included in an acknowledgement data unit, according to an embodiment. In an embodiment, the Block Ack information field 1200 corresponds to the Block Ack information field 502-6 of the acknowledgement data unit 500 of FIG. 5. In other embodiments, the Block Ack information field 1200 is included in suitable acknowledgement data units different from the acknowledgement data unit 500 of FIG. 5. The Block Ack information field 1200 is included in a single user data unit used to acknowledge MPDUs received in an A-MPDU from a particular single communication device (e.g., a particular client station 25), in an embodiment. The Block Ack information field 1200 includes a plurality of AID TID Block Ack information fields 1202 corresponding to the particular single communication device and a particular traffic class, according to an embodiment. The AID TID Block Ack information fields 1202 are used to acknowledge respective subsets of MPDUs received from the particular device and corresponding to the particular traffic class, according to an embodiment. Each AID TID Block Ack information field 1202 is generally the same as the AID TID Block Ack information field 800 of FIG. 8, in an embodiment. In an embodiment, each AID TID Block Ack information field 1202 includes a respective AID TID information subfield 1204 corresponding to the AID TID information subfield 802-1 of the AID TID Block Ack information field 800 of FIG. 8, a respective Block Ack Staring sequence Control subfield 1206 corresponding to the Block Ack Staring sequence Control subfield 704 of the AID TID Block Ack information field 800 of FIG. 8, and a respective Block Ack bitmap subfield 1208 corresponding to the Block Ack bitmap subfield 702-4 of the AID TID Block Ack information field 800 of FIG. 8.

The Block Ack information field 1200 includes a first AID TID Block Ack information field 1202-1 and a second AID TID Block Ack information field 1202-2, in the illustrated embodiment. The first AID TID Block Ack information field 1202-1 and the second AID TID Block Ack information field 1202-2 are used to acknowledge respective subsets of MPDUs received from a single device (e.g., a single client station 25) and corresponding to a single traffic class, according to an embodiment. As just an example, the first AID TID Block Ack information field 1202-1 and the second AID TID Block Ack information field 1202-2 are used to acknowledge respective subsets of MPDUs received from a client station 25 associated with an AID 12 and corresponding to a traffic class associated with TID 6, in the illustrated embodiment. Accordingly, the respective AID TID information subfields 1204 of the first AID TID Block Ack information field 1202-1 and the second AID TID Block Ack information field 1202-2 is each set to indicate AID of 12 and TID of 6, in this embodiment. The respective Block Ack sequence control subfields 1206 indicate respective lengths of the Block Ack bitmap subfields 1208, in an embodiment. For example, respective Block Ack sequence control subfields 1206 include respective Block Ack bitmap length subfields such as the Block Ack bitmap length subfield 702-2 in FIG. 7, in an embodiment. In the illustrated embodiment, the respective Block Ack bitmap length subfields are set to indicate the respective lengths of the Block Ack bitmap subfields 1208 used to acknowledge the respective subsets of MPDUs received from the client station 25 associated with AID 12 and corresponding to the traffic class associated with TID 6. In an example embodiment, the first subset of MPDUs acknowledged in the first AID TID Block Ack information field 1202-1 includes 256 MPDUs, and the Block Ack bitmap length subfield of the Block Ack sequence control subfield 1202-1 is set to indicate that the Block Ack bitmap subfield 1208-1 comprises 32 bytes to acknowledge 256 MPDUs. Similarly, in an embodiment in which the second subset of MPDUs acknowledged in the second AID TID Block Ack information field 1202-2 includes a maximum of 256 MPDUs, the Block Ack bitmap length subfield of the Block Ack sequence control subfield 1202-2 is set to indicate that the Block Ack bitmap subfield 1208-2 comprises 32 bytes to acknowledge a maximum of 256 MPDUs. On the other hand, in an embodiment in which the second subset of MPDUs acknowledged in the second AID ID Block Ack information field 1202-2 includes a maximum of 128 MPDUs, the Block Ack bitmap length subfield of the Block Ack sequence control subfield 1202-2 is set to indicate that the Block Ack bitmap subfield 1208-2 comprises 16 bytes to acknowledge a maximum of 128 MPDUs, in an embodiment. The respective lengths of the Block Ack bitmap subfields 1208 are determined, at least in part, based on a buffer size (e.g., a total buffer size or a buffer size allocated for the corresponding traffic class) negotiated during block acknowledgment negotiation (e.g., ADDBA negotiation) with the particular communication device, in an embodiment. For example, the respective lengths of the Block Ack bitmap subfields 1208 are determined such that the combined length of the Block Ack bitmap subfields 1208 does not exceed the buffer size negotiated during block acknowledgment negotiation (e.g., ADDBA negotiation) with the particular communication device, in some embodiments.

Figure 13:
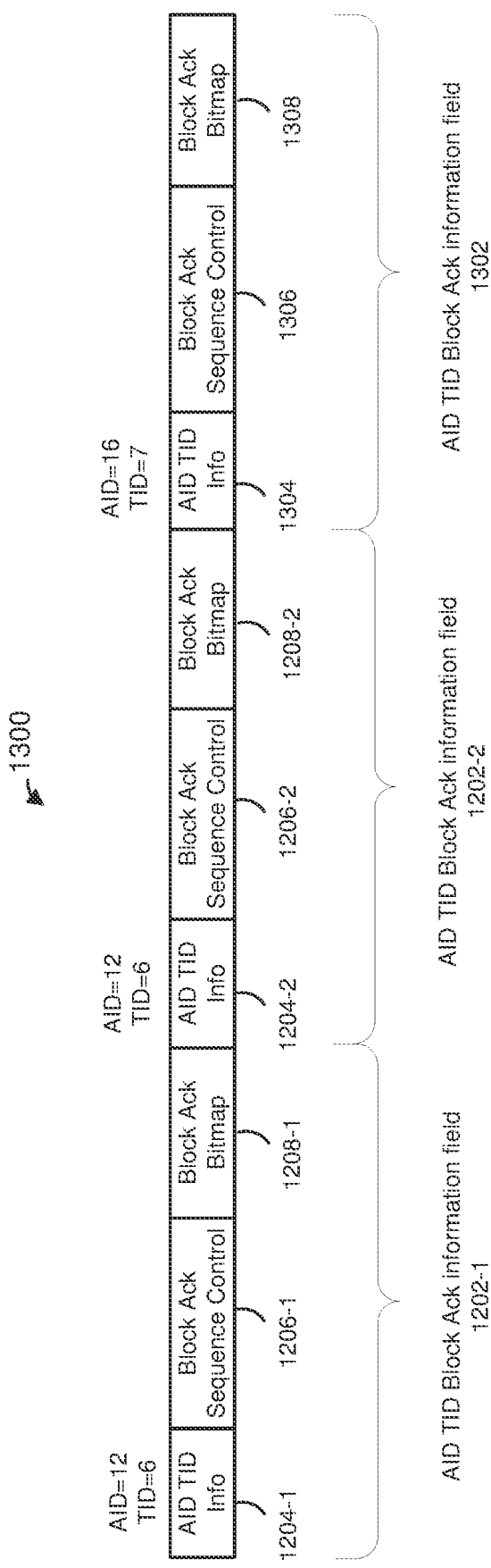
FIG. 13 is a block diagram of a Block Ack information field included in an acknowledgement data unit, according to another embodiment.

FIG. 13 is a block diagram of a Block Ack information field 1300 included in an acknowledgement data unit, according to another embodiment. In an embodiment, the Block Ack information field 1300 corresponds to the Block Ack information field 502-6 of the acknowledgement data unit 5 of FIG. 5. In other embodiments, the Block Ack information field 1300 is included in suitable acknowledgement data units different from the acknowledgement data unit 500 of FIG. 5. The Block Ack information field 1300 is included in a multi user data unit used to acknowledge MPDUs received in respective A-MPDUs from the multiple communication devices (e.g., multiple client stations 25), in an embodiment. The Block Ack information field 1300 is similar to the Block Ack information field 1200 of FIG. 2. The Block Ack information field 1300 includes the multiple AID TID Block Ack information fields 1202 of the Block Ack information field 1200 of FIG. 12 corresponding a first communication device for which numbers of MPDUs being acknowledged exceeds the maximum number of MPDUs that can be acknowledged by a single AID TID Block Ack information field, in an embodiment. The Block Ack information field 1300 additionally includes an additional AID TID Block Ack information field 1302 corresponding to a second communication device (e.g., a second client station 25) for which the number of MPDUs being acknowledged does not exceed the maximum number of MPDUs that can be acknowledged by a single AID TID Block Ack information field, in an embodiment.

The additional AID TID Block Ack information field 1302 is generally the same as the AID TID Block Ack information field 800 of FIG. 8, in an embodiment. The AID TID Block Ack information field 1302 includes an AID TID information subfield 1304 corresponding to the AID TID information subfield 802-1 of the AID TID Block Ack information field 800 of FIG. 8, a Block Ack Staring sequence control subfield 1306 corresponding to the Block Ack Staring sequence Control subfield 704 of the AID TID Block Ack information field 800 of FIG. 8, and a Block Ack bitmap subfield 1308 corresponding to the Block Ack bitmap subfield 702-4 of the AID TID Block Ack information field 800 of FIG. 8, in an embodiment. In an embodiment, the AID TID information subfield 1304 of the AID TID Block Ack information field 1302 includes an identifier of the second communication device different than the first communication device indicated in the respective AID TID information subfields 1202 of the first AID TID Block Ack information field 1202-1 and the second AID TID Block Ack information field 1202-2 and, in some embodiments, a second traffic class different that a first traffic class indicated in the respective AID TID information subfields 1202 of the first AID TID Block Ack information field 1202-1 and the second AID TID Block Ack information field 1202-2. For example, whereas the respective AID TID information subfield 1204 of the first AID TID Block Ack information field 1202-1 and the second AID TID Block Ack information field 1202-2 is each set to indicate AID of 12 and TID of 6, the AID TID information subfield 1304 of the AID TID Block Ack information field 1302 is set to indicate AID of 16 and TID of 7, in the illustrated embodiment. The Block Ack Staring sequence control subfield 1306 indicates a length of the Block Ack bitmap subfield 1308, in an embodiment. The length of the Block Ack bitmap subfield 1308 is determined based, at least in part, on a buffer size (e.g., a total buffer size or a buffer size allocated for the corresponding traffic class) negotiated during block acknowledgment negotiation (e.g., ADDBA negotiation) with the second communication device, in an embodiment. For example, the length of the Block Ack bitmap subfield 1308 does not exceed the buffer size negotiated during block acknowledgment negotiation (e.g., ADDBA negotiation) with the second communication device, in some embodiments.

In some embodiments, a Block Ack information field that conforms to the first communication protocol is longer that a Block information field that conforms to the legacy communication protocol. For example, a length of a Block Ack bitmap field can be longer than a longest field defined in the legacy communication protocol to accommodate the greater number of maximum MPDUs that can be aggregated in a single A-MPDU in accordance with the first communication protocol. In some such embodiments, a single Block Ack information field is used to acknowledge MPDUs in an A-MPDU received from a communication device that conforms to the first communication protocol, even if the number of MPDUs of a particular traffic class being acknowledged exceeds the maximum number of MPDUs that can be acknowledged in a longest Block Ack information field specified in the legacy communication protocol.

Figure 14:
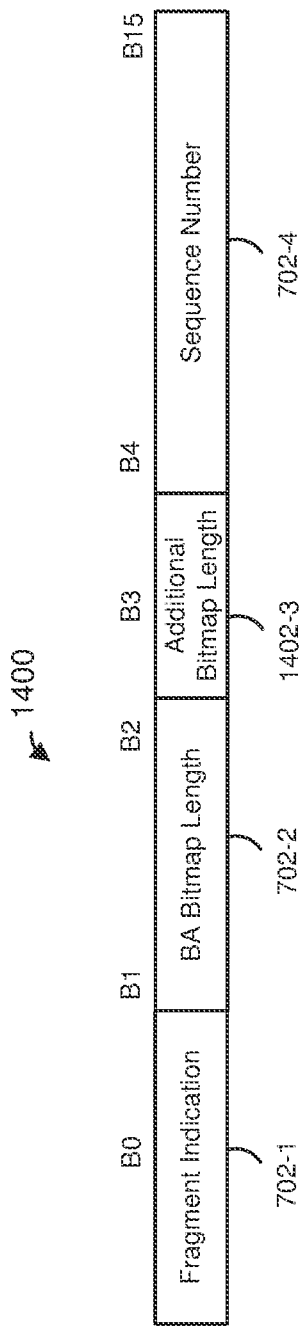
FIG. 14 is a Block Ack starting sequence control field included in an acknowledgement data unit, according to an embodiment.

In some such embodiments, the Block Ack information field that conforms to the first communication protocol includes an additional length indication, in addition to a block acknowledgement (e.g., bitmap) length indication defined in the legacy communication protocol. In an embodiment, the additional length indication in combination with the block acknowledgement length indication defined in the legacy communication protocol is used to indicate greater acknowledgement field (e.g., bitmap) field lengths that the maximum block acknowledgement defined in the legacy communication protocol. FIG. 14 is a block diagram of a Block Ack starting sequence control field 1400 included in an acknowledgement data unit, according one such embodiment. In an embodiment, the Block Ack starting sequence control field 1400 is included in the Block Ack information field 502-6 of the acknowledgement data unit 5 of FIG. 5. In other embodiments, the Block Ack information field 1200 is included in suitable acknowledgement data units different from the acknowledgement data unit 500 of FIG. 5. The Block Ack starting sequence control field is similar to the Block Ack starting sequence control field 704 of FIG. 7 except that the reserved subfield 702-2 of the Block Ack starting sequence control field 704 of FIG. 7 is redefined as an additional bitmap length subfield 1402-3 in the Block Ack starting sequence control field 1400, in an embodiment. In an embodiment, the value of the Block Ack bitmap subfield 702-4 is interpreted based on the value of the additional bitmap length subfield 1402-3. For example, in an embodiment, the additional bitmap length subfield 1402-3 comprises one bit set to indicate whether the length of the Block Ack bitmap subfield 702-4 indicated in the Block Ack bitmap length subfield length 702-2 is a length selected from a first set of predetermined lengths or a length selected from a second set of predetermined lengths, in an embodiment. For example, a first value (e.g., a logic zero) of the additional bitmap length subfield 1402-3 indicates that the length of the Block Ack bitmap subfield 702-4 indicated in the Block Ack bitmap length subfield length 702-2 is a length selected from a first set of predetermined lengths {4 bytes, 8 bytes, 16 bytes, and 32 bytes}, and a second value (e.g., a logic one) of the additional bitmap length subfield 1402-3 indicates that the length of the Block Ack bitmap subfield 702-4 indicated in the Block Ack bitmap length subfield length 702-2 is a length selected from a second set of predetermined lengths {48 bytes, 64 bytes, 128 bytes, and 256 bytes}, in an example embodiment.

Referring briefly to FIG. 15, a table 1500 illustrates an example interpretation of the value of the Block Ack bitmap subfield 702-4 based on the value of the additional bitmap length subfield 1402-3, and corresponding maximum numbers of MDPUs that can be acknowledged in the Block Ack bitmap subfield 702-4, according to an embodiment. In other embodiments, the value of the Block Ack bitmap subfield 702-4 is interpreted based on the value of the additional bitmap length subfield 1402-3 to indicate other suitable lengths of the Block Ack bitmap field 702-4 and other corresponding maximum numbers of MPDUs that can be acknowledged.

Figure 16:
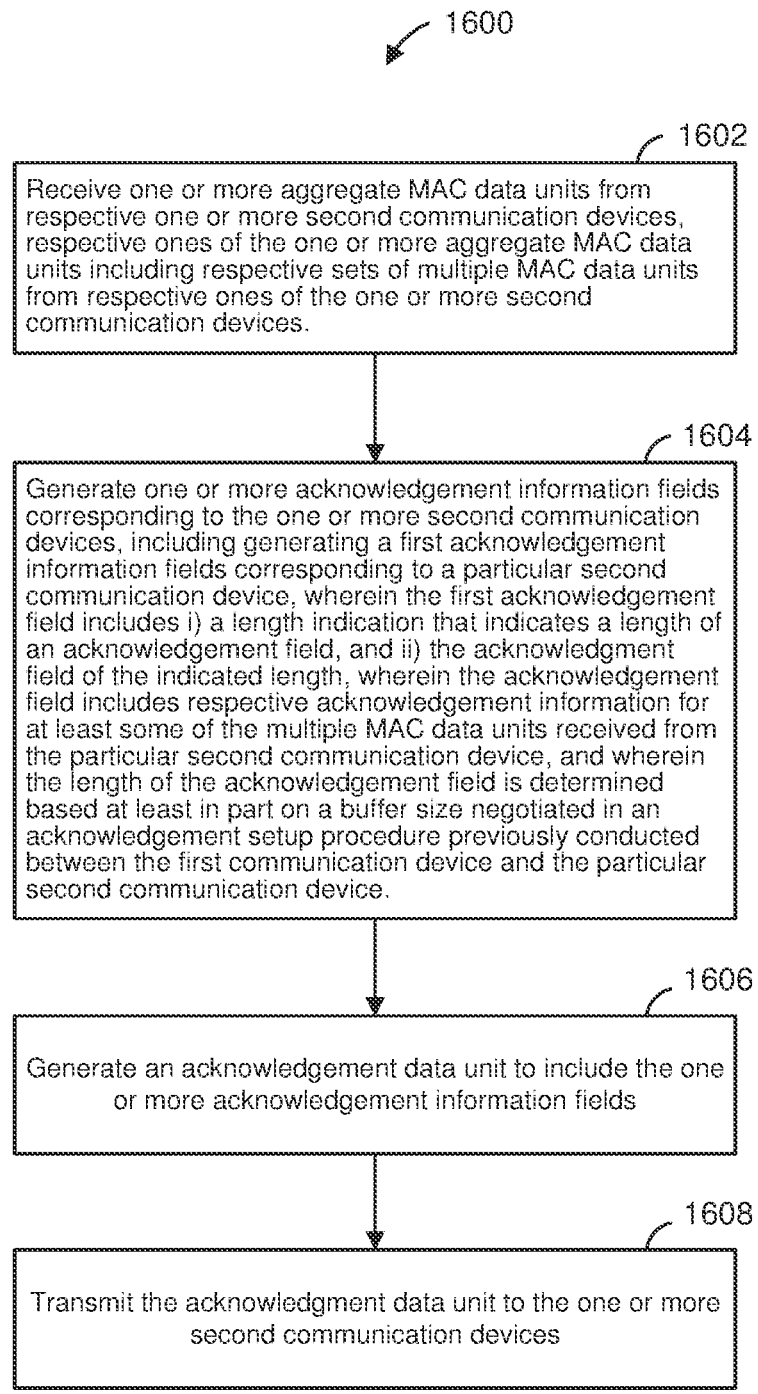
FIG. 16 is a flow diagram of an example method for acknowledging data units in a wireless local area network, according to another embodiment.

FIG. 16 is a flow diagram of an example method 1600 for acknowledging data units in a wireless local area network, according to an embodiment. In an embodiment, the method 1100 is implemented by a first communication device. The first communication device is an AP such as the AP 14 or a client station such as the client station 25-1, for example, in various embodiments. For example, the method 1100 is implemented by the MAC processor 18 and/or by the PHY processor 20 of the AP 14, in an embodiment. As another example, the method 1100 is implemented by the MAC processor 28 and/or by the PHY processor 29 of the client station 25-1, in another embodiment. In other embodiments, the method 1100 is implemented by other suitable communication devices.

At block 1602, one or more aggregate MAC data units are received from one or more second communication devices. Respective ones of the one or more aggregate MAC data units include respective sets of multiple MAC data units from respective ones of the one or more second communication devices, in an embodiment. In an embodiment, a received aggregate MAC data units is included in a PHY data unit (e.g., the PHY data unit 200 of FIG. 2A) received from a second communication device. In another embodiment, respective ones of the received aggregate MAC data units are included in respective PHY data units (e.g., the PHY data unit 370 of FIG. 3C) received from respective ones of multiple second communication devices. In other embodiments, the one or more aggregate MAC data units are received is other suitable manners.

At block 1604, one or more acknowledgement information fields corresponding to the one or more second communication devices are generated. In an embodiment, generating the one or more acknowledgement information fields includes generating a first acknowledgement information field corresponding to a particular second communication device. For example, generating the one or more acknowledgement information fields includes generating the Block Ack information field 700 of FIG. 7, in an embodiment. As another example, generating the one or more acknowledgement information fields includes generating the Block Ack information field 800 of FIG. 8, in another embodiment. As yet another example, in yet another embodiment, generating the one or more acknowledgement information fields includes generating AID TID Block Ack information field 1202-1 of FIGS. 12-13. In other embodiments, other suitable first acknowledgement fields are generated. In an embodiment, the first acknowledgement field includes i) a length indication that indicates a length of an acknowledgement field and ii) the acknowledgment field of the indicated length, wherein the acknowledgement field includes respective acknowledgement information for at least some of the multiple MAC data units received from the particular second communication device. In an embodiment, the length of the acknowledgement field is determined based at least in part on a buffer size negotiated in an acknowledgement setup procedure previously conducted between the first communication device and the particular second communication device. For example, the particular length of the acknowledgement field is determined based at least in part on a buffer size negotiated in an ADDBA negotiation procedure, or another suitable acknowledgement setup procedure, previously conducted between the first communication device and the particular second communication device. In an embodiment, the particular length is determined such that the particular length does not exceed an acknowledgement field length required to acknowledge a maximum number of the at least some MAC data units determined based on the negotiated buffer size.

At block 1606, an acknowledgement data unit is generated to include the one or more acknowledgement information fields generated at block 1604. In an embodiment, the acknowledgement data unit 500 of FIG. 5 is generated. In another embodiment, a suitable acknowledgement data unit different from the acknowledgement data unit 500 of FIG. 5 is generated.

At block 1606, the acknowledgement data unit generated at block 1604 is transmitted to the one or more second communication devices.

In an embodiment, a method for acknowledging a data unit includes: receiving, at a first communication device, one or more aggregate medium access control (MAC) data units from respective one or more second communication devices, respective ones of the one or more aggregate MAC data units including respective sets of multiple MAC data units from respective ones of the one or more second communication devices; generating, at the first communication device, one or more acknowledgement information fields corresponding to the one or more second communication devices, including generating a first acknowledgement information field corresponding to a particular second communication device of the one or more second communication devices, wherein the first acknowledgement field includes i) a length indication that indicates a length of an acknowledgement field, and ii) the acknowledgment field of the indicated length, wherein the acknowledgement field includes respective acknowledgement information for at least some of the multiple MAC data units received from the particular second communication device, and wherein the length of the acknowledgement field is determined based at least in part on a buffer size negotiated in an acknowledgement setup procedure previously conducted between the first communication device and the particular second communication device: generating, at the first communication device, an acknowledgement data unit to include the one or more one or more acknowledgement information fields; and transmitting the acknowledgment data unit from the first communication device to the one or more second communication devices.

In other embodiments, the method includes any suitable combination of one or more of the following features.

Generating the one or more acknowledgement information fields further includes generating a second acknowledgement information field corresponding to the particular second communication device, wherein i) the first acknowledgement information field is generated to acknowledge a first subset of the multiple MAC data units received from the particular second communication device and ii) the second acknowledgement information is generated to acknowledge a second subset of the multiple MAC data units received from the particular second communication device.

The first subset of the multiple MAC data units and the second subset of the multiple MAC data units comprise MAC data units of a first traffic class.

Generating the acknowledgement data unit includes generating the acknowledgement data unit such that the second acknowledgement information field corresponding to the particular second communication device immediately follows the first acknowledgement information field corresponding to the particular second communication device.

Generating the one or more acknowledgement information fields further includes generating a third acknowledgement information field corresponding to the particular second communication device.

The third acknowledgement information field is generated to acknowledge a third subset of the multiple MAC data units received from the particular second communication device, the third subset of the multiple MAC data units comprising MAC data units of a second traffic different from the first traffic class.

Generating the one or more acknowledgement information fields further includes generating a third acknowledgement information field corresponding to an additional second communication device of the one or more second communication devices.

The third acknowledgement information field is generated to acknowledge at least some of the multiple MAC data units received from the additional second communication device.

The first acknowledgement information field further includes an additional length indication, wherein a value of the length indication is interpreted based on a value of the additional length indication.

The length indication is interpreted i) to indicate a first length if the additional length indication is set to a first value, the first length selected from a first set of predetermined lengths or ii) to indicate a second length different from the first length if the additional length indication is set to a second value, the second length selected from a second set of predetermined length different from the first set of predetermined lengths.

The acknowledgement field includes a bitmap of the indicated length, wherein respective bits of the bitmap indicate acknowledgments of respective MAC data unit of the at least some of the multiple MAC data units received from the particular second communication device.

The particular second communication device conforms to a first communication protocol that supports aggregation of a first maximum number of MAC data units in an aggregate MAC data unit.

Generating the one or more acknowledgement information fields includes generating i) a single acknowledgement information field corresponding to an additional second communication device of the one or more second communication devices, the additional second communication device conforming to a second communication protocol that supports aggregation of a second maximum number of MAC data units in an aggregate MAC data unit, wherein the second maximum number of MAC data units is smaller than the first maximum number of MAC data units, and ii) multiple acknowledgement information fields corresponding to the particular second communication device, respective ones of the multiple acknowledgement fields a) conforming to the first communication protocol and ii) having a maximum length corresponding to the second maximum number of MAC data units supported by the second communication protocol.

In another embodiment, a first communication device comprises a network interface having one or more integrated circuits configured to: receive one or more aggregate medium access control (MAC) data units from respective one or more second communication devices, respective ones of the one or more aggregate MAC data units including respective sets of multiple MAC data units from respective ones of the one or more second communication devices; generate one or more acknowledgement information fields corresponding to the one or more second communication devices, including generating a first acknowledgement information fields corresponding to a particular second communication device of the one or more second communication devices, wherein the first acknowledgement field includes i) a length indication that indicates a length of an acknowledgement field, and ii) the acknowledgment field of the indicated length, wherein the acknowledgement field includes respective acknowledgement information for at least some of the multiple MAC data units received from the particular second communication device, and wherein the length of the acknowledgement field is determined based at least in part on a buffer size negotiated in an acknowledgement setup procedure previously conducted between the first communication device and the particular second communication device; generate an acknowledgement data unit to include at least the first acknowledgement information field; and cause the acknowledgment data unit to be transmitted to the one or more second communication devices.

In other embodiments, the first communication device includes any suitable combination of one or more of the following features.

The one or more integrated circuits are further configured to generate a second acknowledgement information field corresponding to the particular second communication device, wherein i) the first acknowledgement information field corresponding to the is generated to acknowledge a first subset of the multiple MAC data units received from the particular second communication device and ii) the second acknowledgement information is generated to acknowledge a second subset of the multiple MAC data units received from the particular second communication device.

The first subset of the multiple MAC data units and the second subset of the multiple MAC data units comprise MAC data units of a first traffic class.

The one or more integrated circuits are configured to generated the acknowledgement data unit such that the second acknowledgement information field corresponding to the particular second communication device immediately follows the first acknowledgement information field corresponding to the particular second communication device.

The one or more integrated circuits are further configured to generate a third acknowledgement information field corresponding to the particular second communication device.

The third acknowledgement information field is generated to acknowledge a third subset of the multiple MAC data units received from the particular second communication device, the third subset of the multiple MAC data units comprising MAC data units of a second traffic different from the first traffic class.

The one or more integrated circuits are further configured to generate a third acknowledgement information field corresponding to an additional second communication device of the one or more second communication devices.

The third acknowledgement information field is generated to acknowledge at least some of the multiple MAC data units received from the additional second communication device.

The first acknowledgement information field further includes an additional length indication, wherein a value of the length indication is interpreted based on a value of the additional length indication.

The length indication is interpreted i) to indicate a first length if the additional length indication is set to a first value, the first length selected from a first set of predetermined lengths or ii) to indicate a second length different from the first length if the additional length indication is set to a second value, the second length selected from a second set of predetermined length different from the first set of predetermined lengths.

The acknowledgement field includes a bitmap of the indicated length, wherein respective bits of the bitmap indicate acknowledgments of respective MAC data unit of the at least some of the multiple MAC data units received from the particular second communication device.

The particular second communication device conforms to a first communication protocol that supports aggregation of a first maximum number of MAC data units in an aggregate MAC data unit.

The one or more integrated circuits are configured to generate the one or more acknowledgement information fields at least by generating i) a single acknowledgement information field corresponding to an additional second communication device of the one or more second communication devices, the additional second communication device conforming to a second communication protocol that supports aggregation of a second maximum number of MAC data units in an aggregate MAC data unit, wherein the second maximum number of MAC data units is smaller than the first maximum number of MAC data units, and ii) multiple acknowledgement information fields corresponding to the particular second communication device, respective ones of the multiple acknowledgement fields a) conforming to the first communication protocol and ii) having a maximum length corresponding to the second maximum number of MAC data units supported by the second communication protocol.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for acknowledging a data unit, the method comprising:
sending, by a first communication device, an aggregate medium access control (MAC) data unit to a second communication device, the aggregate MAC data unit including a set of multiple MAC data units; and
receiving, by the first communication device, an acknowledgement data unit from the second communication device which includes one or more one or more acknowledgement information fields, the one or more acknowledgement information fields comprising a first acknowledgement information field, wherein the first acknowledgement information field includes
(i) a length indication that indicates a length of an acknowledgement field, the length of the acknowledgement field being selected from a subset of predetermined lengths, among a set of predetermined lengths, the subset including multiple predetermined lengths that do not exceed a buffer size determined based on an acknowledgement setup procedure previously conducted between the first communication device and the second communication device, and
(ii) the acknowledgment field of the indicated length, wherein the acknowledgement field includes respective acknowledgement information for at least some of the multiple MAC data units.

2. The method of claim 1, wherein the one or more acknowledgement information fields comprises a plurality of acknowledgement information fields, the plurality of acknowledgement information fields further includes a second acknowledgement information field, wherein i) the first acknowledgement information field acknowledges a first subset of the multiple MAC data units sent to the second communication device and ii) the second acknowledgement information field acknowledges a second subset of the multiple MAC data units sent to the second communication device.

3. The method of claim 2, wherein the first subset of the multiple MAC data units and the second subset of the multiple MAC data units comprise MAC data units of a first traffic class.

4. The method of claim 2, wherein receiving the acknowledgement data unit includes receiving the acknowledgement data unit such that the second acknowledgement information field immediately follows the first acknowledgement information field.

5. The method of claim 2, wherein the plurality of acknowledgement information fields further includes a third acknowledgement information field, wherein the third acknowledgement information field acknowledges a third subset of the multiple MAC data units, the third subset of the multiple MAC data units comprising MAC data units of a second traffic class different from the first subset of the multiple MAC data units and the second subset of the multiple MAC data units which comprise MAC data units of a first traffic class.

6. The method of claim 1, wherein the first acknowledgement information field further includes an additional length indication, wherein a value of the length indication is interpreted based on a value of the additional length indication.

7. The method of claim 6, wherein the length indication is interpreted i) to indicate a first length if the additional length indication is set to a first value and the second communication device conforms to a first communication protocol, the first length selected from a first set of predetermined lengths and ii) to indicate a second length, different from the first length if the additional length indication is set to a second value and the second communication device conforms to a second communication protocol, the second length selected from a second set of predetermined lengths different from the first set of predetermined lengths.

8. The method of claim 1, wherein the first acknowledgement field includes a bitmap of the indicated length, wherein respective bits of the bitmap indicate acknowledgments of respective MAC data unit of the at least some of the multiple MAC data units.

9. The method of claim 1, wherein
the second communication device conforms to a first communication protocol that supports receiving a first maximum number of MAC data units in the aggregate MAC data unit, sending, by the first communication device, an aggregate MAC data unit to a third communication device, the aggregate MAC data unit sent to the third communication device including a set of multiple MAC data units and receiving, by the first communication device, one or more acknowledgement data units with one or more acknowledgement information fields from the third communication device, the third communication device conforming to a second communication protocol that supports receiving a second maximum number of multiple MAC data units in the aggregate MAC data unit sent to the third communication device, wherein the second maximum number of MAC data units is different than the first maximum number of MAC data units.

10. A first communication device, comprising:
a network interface having one or more integrated circuits configured to:
send an aggregate medium access control (MAC) data unit to a second communication device, the aggregate MAC data unit including a set of multiple MAC data units, and
receive an acknowledgement data unit from the second communication device which includes one or more one or more acknowledgement information fields, the one or more acknowledgement information fields comprising a first acknowledgement information field, wherein the first acknowledgement information field includes
(i) a length indication that indicates a length of an acknowledgement field, the length of the acknowledgement field being selected from a subset of predetermined lengths, among a set of predetermined lengths, the subset including multiple predetermined lengths that do not exceed a buffer size determined based on an acknowledgement setup procedure previously conducted between the first communication device and the second communication device, and
(ii) the acknowledgment field of the indicated length, wherein the acknowledgement field includes respective acknowledgement information for at least some of the multiple MAC data units.

11. The first communication device of claim 10, wherein the one or more acknowledgement information fields comprises a plurality of acknowledgement information fields, the plurality of acknowledgement information fields further includes a second acknowledgement information field, wherein i) the first acknowledgement information field acknowledges a first subset of the multiple MAC data units sent to the second communication device and ii) the second acknowledgement information field acknowledges a second subset of the multiple MAC data units sent to the second communication device.

12. The first communication device of claim 11, wherein the first subset of the multiple MAC data units and the second subset of the multiple MAC data units comprise MAC data units of a first traffic class.

13. The first communication device of claim 11, wherein the one or more integrated circuits are configured to receive the acknowledgement data unit such that the second acknowledgement information field immediately follows the first acknowledgement information field.

14. The first communication device of claim 11, wherein the plurality of acknowledgement information fields further includes a third acknowledgement information field, wherein the third acknowledgement information field acknowledges a third subset of the multiple MAC data units, the third subset of the multiple MAC data units comprising MAC data units of a second traffic class different from the first subset of the multiple MAC data units and the second subset of the multiple MAC data units which comprise MAC data units of a first traffic class.

15. The first communication device of claim 10, wherein the first acknowledgement information field further includes an additional length indication, wherein a value of the length indication is interpreted based on a value of the additional length indication.

16. The first communication device of claim 15, wherein the length indication is interpreted i) to indicate a first length if the additional length indication is set to a first value and the second communication device conforms to a first communication protocol, the first length selected from a first set of predetermined lengths and ii) to indicate a second length different from the first length if the additional length indication is set to a second value and the second communication device conforms to a second communication protocol, the second length selected from a second set of predetermined length different from the first set of predetermined lengths.

17. The first communication device of claim 10, wherein the first acknowledgement field includes a bitmap of the indicated length, wherein respective bits of the bitmap indicate acknowledgments of respective MAC data unit of the at least some of the multiple MAC data units received from the second communication device.

18. The first communication device of claim 10, wherein the second communication device conforms to a first communication protocol that supports receiving a first maximum number of MAC data units in the aggregate MAC data unit, and the one or more integrated circuits are configured to send an aggregate MAC data unit to a third communication device, the aggregate MAC data unit sent to the third communication device including a set of multiple MAC data units and receive one or more acknowledgement data units with one or more acknowledgement information fields from the third communication device, the third communication device conforming to a second communication protocol that supports receiving a second maximum number of MAC data units in the aggregate MAC data unit sent to the third communication device, wherein the second maximum number of MAC data units is different than the first maximum number of MAC data units.

* * * * *